US012235461B2

(12) United States Patent
Nicholls et al.

(10) Patent No.: US 12,235,461 B2
(45) Date of Patent: Feb. 25, 2025

(54) CONTROLLING OPTICAL PARAMETERS AT A USER'S EYE

(71) Applicant: Meta Platforms Technologies, LLC, Menlo Park, CA (US)

(72) Inventors: William Aaron Nicholls, Seattle, WA (US); Barry David Silverstein, Kirkland, WA (US); Robin Sharma, London (GB); Ian Erkelens, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/320,718

(22) Filed: May 19, 2023

(65) Prior Publication Data
US 2023/0375844 A1    Nov. 23, 2023

Related U.S. Application Data

(60) Provisional application No. 63/384,258, filed on Nov. 18, 2022, provisional application No. 63/344,385, (Continued)

(51) Int. Cl.
*G02B 27/00* (2006.01)
*G02B 27/01* (2006.01)
(Continued)

(52) U.S. Cl.
CPC ..... *G02B 27/0179* (2013.01); *G02B 27/0093* (2013.01); *G02B 27/0172* (2013.01);
(Continued)

(58) Field of Classification Search
CPC ............ G02B 27/0093; G02B 27/0172; G02B 27/0179; G02B 2027/0178;
(Continued)

(56) References Cited

U.S. PATENT DOCUMENTS

2019/0385342 A1\* 12/2019 Freeman ................ G06T 11/00
2021/0031051 A1\* 2/2021 Kubota ................ A61N 5/0622
(Continued)

OTHER PUBLICATIONS

Shen et al., "Peripheral Refraction with an without Contact Lens Correction," NIH Public Access, published in Optom Vis Sci. Sep. 2010; 87(9): 642-655. doi: 10.1097/OPX.0b013e3181ea16ea.

*Primary Examiner* — Ryan A Lubit
(74) *Attorney, Agent, or Firm* — Potomac Law Group, PLLC; Dannon G. Allbee

(57) ABSTRACT

Aspects of the present disclosure are directed to controlling optical parameters at a user's eye using an artificial reality system and tracked user conditions. For example, based on tracked user eye positioning, implementations can adjust the light that enters the user's eye to control an image shell generated at the user's eye. An image shell refers to the way light, that enters the eye, focuses on the retina of the eye. Example properties of an image shell include image shell centration, image shell curvature, image shell shape, etc. A user may focus on an object in an artificial reality environment (e.g., real-world object or virtual object) and light from the object can generate an image shell at the user's eyes. The image shell at the user's eyes can impact the user's vision and/or eye biology.

20 Claims, 24 Drawing Sheets

Related U.S. Application Data filed on May 20, 2022, provisional application No. 63/344,389, filed on May 20, 2022, provisional application No. 63/344,393, filed on May 20, 2022.

(51) Int. Cl.
*G06F 1/16* (2006.01)
*G06F 3/01* (2006.01)
*G09G 3/00* (2006.01)

(52) U.S. Cl.
CPC .............. *G06F 1/163* (2013.01); *G06F 3/013* (2013.01); *G09G 3/001* (2013.01); *G02B 2027/0178* (2013.01); *G02B 2027/0187* (2013.01); *G09G 2320/0626* (2013.01); *G09G 2320/066* (2013.01); *G09G 2320/0666* (2013.01); *G09G 2340/045* (2013.01); *G09G 2354/00* (2013.01)

(58) Field of Classification Search
CPC . G02B 2027/0187; G06F 1/163; G06F 3/013; G09G 3/001; G09G 2320/0626; G09G 2320/066; G09G 2320/0666; G09G 2340/045; G09G 2354/00
See application file for complete search history.

(56) References Cited

U.S. PATENT DOCUMENTS

| | | | |
|---|---|---|---|
| 2021/0330185 A1* | 10/2021 | Krukowski | A61B 3/028 |
| 2023/0115678 A1* | 4/2023 | Lopez | G02F 1/294 |
| | | | 345/7 |
| 2023/0142618 A1* | 5/2023 | Boyle | G02B 27/017 |
| | | | 351/209 |
| 2023/0377493 A1 | 11/2023 | Nicholls et al. | |

* cited by examiner

CONTROLLING OPTICAL PARAMETERS AT A USER'S EYE

PRIORITY

This application claims priority to U.S. Provisional Patent Application No. 63/344,385 titled "CONTROLLING OPTICAL PARAMETERS AT A USER'S EYE," filed May 20, 2022, U.S. Provisional Patent Application No. 63/344,389 titled "MODEL BASED CONTROL OF OPTICAL PARAMETERS AT A USER'S EYE," filed May 20, 2022, U.S. Provisional Patent Application No. 63/344,393 titled "AUTOMATIC VARIED VISUAL EXPERIENCE IN AN ARTIFICIAL REALITY SYSTEM," filed May 20, 2022, and U.S. Provisional Patent Application No. 63/384,258 titled "MODEL BASED CONTROL OF OPTICAL PARAMETERS AT A USER'S EYE," filed Nov. 18, 2022, which are each herein incorporated by reference in their entireties.

TECHNICAL FIELD

The present disclosure is directed to controlling optical parameters at a user's eye e.g., using an artificial reality system and tracked user conditions.

BACKGROUND

Artificial reality devices have grown in popularity with users, and this growth is predicted to accelerate. These devices can immerse a user in an artificial reality environment and display objects within this immersive experience. For example, in an augmented reality environment or mixed reality environment, portions of the environment can correspond to a real-world setting, such as a room, object, background, etc. The artificial reality device can add one or more virtual objects to this environment that do not correspond with the real-world setting. In another example, the immersive experience can be a virtual reality environment with one or more virtual objects. A user's eyes perceive object at specific locations in these immersive environments according to light from the artificial reality device (e.g., light displayed by the device, light that passes through the device, light manipulated by one or more lenses of the device, etc.). Accordingly, artificial reality devices can impact a user's eyes, including impacts on eye fatigue, eye biology, vision fidelity, or other suitable eye characteristics.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
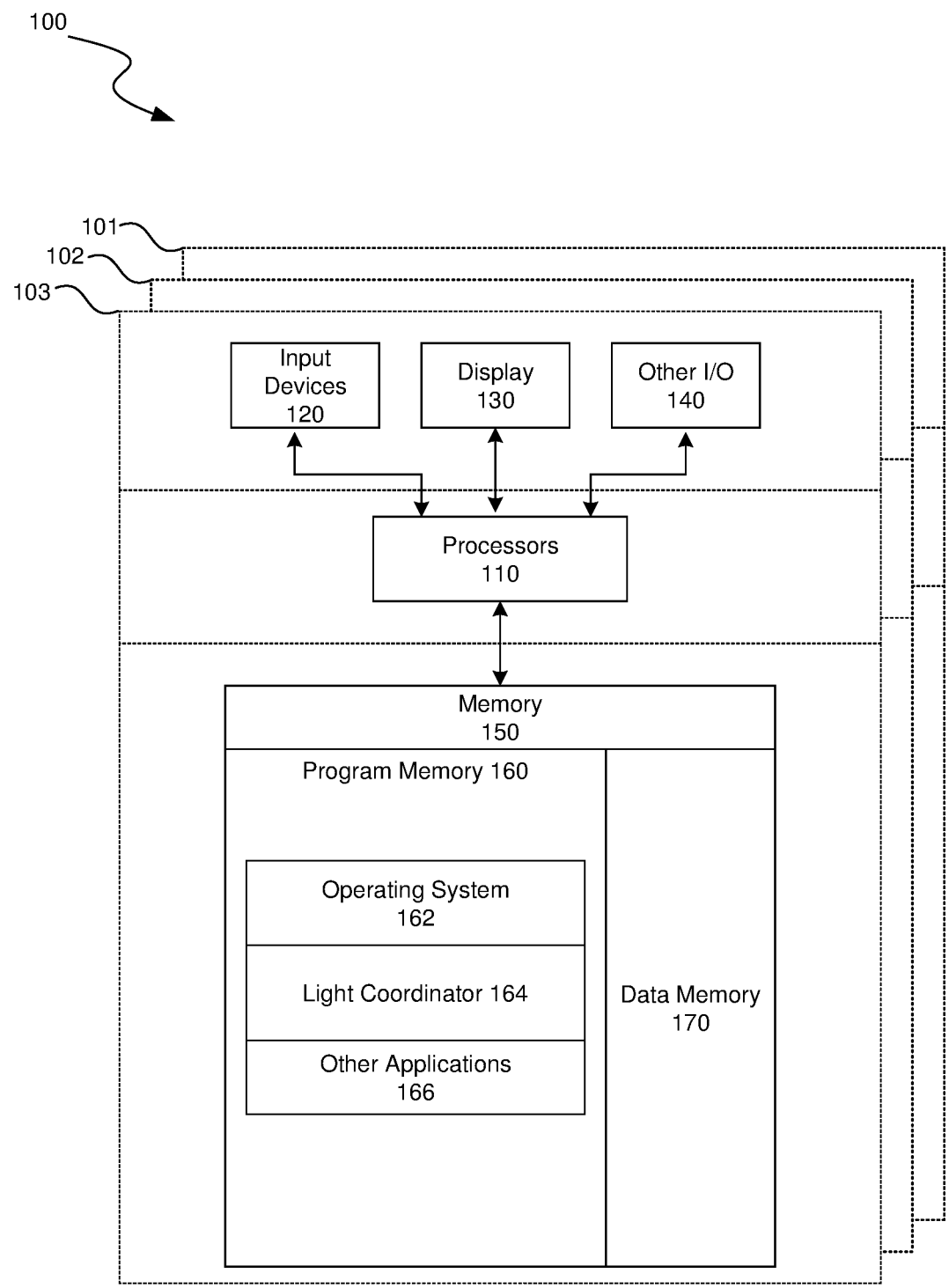
FIG. 1 is a block diagram illustrating an overview of devices on which some implementations of the present technology can operate.

Aspects of the present disclosure are directed to controlling optical parameters at a user's eye using an artificial reality system and tracked user conditions. Implementations of the artificial reality system immerse a user in an artificial reality environment that includes one or more virtual objects and/or one or more real-world objects. For example, a head-mounted display of the artificial reality system can be positioned to generate light that enters the user's eyes and/or pass-through light (e.g., selectively pass-through real-world light) that enters the user's eyes. By controlling and/or manipulating the light from the system, the artificial reality system can present the immersive environment to the user.

Implementations can use any other suitable optical system to generate the artificial reality environment.

Implementations of a light coordinator can control the light that enters one or more of the user's eyes (e.g., via the artificial reality system) according to tracked user conditions. For example, based on tracked user eye positioning, the light coordinator can adjust the light that enters the user's eye to control an image shell generated at the user's eye. An image shell refers to the way light, that enters the eye, focuses on the retina of the eye. Example properties of an image shell include image shell centration, image shell curvature, image shell shape, etc. A user may focus on an object in an artificial reality environment (e.g., real-world object or virtual object) and light from the object can generate an image shell at the user's eyes. The image shell at the user's eyes can impact the user's vision and/or eye biology. Other optical parameters/light properties can also impact the image shell and/or a user's vision, such as luminance, chromatic balance, light spectrum (e.g., color), focal distance at retinal eccentricity, modulation transfer function at retinal eccentricity, etc.

Some implementations control optical parameters at a user's eye using an eye model and an artificial reality system. An eye model coordinator can create an eye model specific to a user based on user characteristics, such as spherical refraction of the user's eye(s), user age, axial length, choroidal thickness, ocular curvature, phoria at near/far, or other suitable characteristics. The eye model can simulate optical parameters generated at the user's eye(s) by light from the artificial reality system. For example, the light coordinator can use output from the eye model to control light provided to the user's eye(s) via the artificial reality system. In some implementations, user eye parameters, such as accommodative state, pupil size, pupil position in eye box, gaze vector/fixation distance, vergence state/distance, etc., can be tracked and provided to the user eye model to simulate optical parameters at the user's eye. In this example, variable input values (e.g., tracked eye parameters) can be fed to the eye model over time and the light coordinator can dynamically control the light that enters the user's eye(s) via the artificial reality system using variable output from the eye model that changes over time.

Implementations of the light coordinator can adjust, based on tracked user eye positioning and/or output from the eye model, any suitable aspect or characteristic of light that enters the user's eye to control any suitable optical parameters that impact the user's vision. For example, the light coordinator can adjust/manipulate light to control optical parameters by varying focal distance at eccentricity, varying image shell curvature, varying resolution/modulation transfer function (MTF) at eccentricity (e.g., between colors), varying field of view, varying focal distance, varying peripheral light curvature, varying the centration of light curvature, adding peripheral myopic defocus cue(s) in a user's periphery, reducing or dynamically varying peripheral contrast, and controlling other suitable optical parameters. Implementations of the light coordinator can monitor dynamic parameters (e.g., while the user is immersed in an XR environment) and generate the personalized XR presentation/display using the personalized eye model.

In some implementations, the light coordinator and eye model can dynamically control optical conditions (e.g., optical conditions at the user's eye, optical conditions presented/displayed by the XR system), such as focal distance, field curvature, distance, or a combination (per pixel/area), locus of centration of focus/curvature, depth of field, resolution/modulation transfer function (MTF) at eccentricity (e.g., optical, content enhancement, and/or rendered via longitudinal chromatic aberration), spectrum (e.g., RGB primary wavelength/bandwidth, balance between), contrast polarity (e.g., white text on black vs. black text on white), and other suitable optical conditions. In some implementations, based on tracked user eye positioning and/or outputs from the personalized model, the light coordinator can adjust the light that enters the user's eye to control an image shell generated at the user's eye.

Some implementations of the light coordinator can control the light that enters one or more of the user's eyes (e.g., via the artificial reality system) according to any suitable temporal condition. For example, a user's circadian rhythm can be impacted by the light that enters the user's eye via the artificial reality system. The light coordinator can control the characteristics of the light that enters the user's eye to sync with and/or mitigate interference with the user's circadian rhythm. In another example, some users may be more or less sensitive to certain types of light at different times of day. The light coordinator can control the characteristics of the light that enters the user's eye according to the time of day. Implementations of the light coordinator can control the characteristics of the light that enters the user's eye according to any other suitable temporal condition.

Implementations of a light coordinator can control the light that enters one or more of the user's eyes (e.g., via the artificial reality system) according to a tracked user experience. For example, parameters for visual experiences presented to the user by the artificial reality system (e.g., an artificial reality environment visual experience) can be monitored over time. Implementations of the light coordinator can, based on the monitored visual experience parameters, vary content displayed by the artificial reality system in the artificial reality environment and/or manipulate light that enters the user's eye to control optical parameters at the user's eye.

Example tracked visual experience parameters for the user include background characteristics (e.g., patterns, colors, distance, aggregated defocus distance, etc.), foreground characteristics (e.g., object shape, dimensions, colors, distance, etc.), eye image shell characteristics (e.g., image shell curvature, centration, etc.), periphery characteristics (e.g., periphery curvature, contrast, defocus cues, etc.), focal distance, fixation distance, luminance, spectrum, Illumination wave shape/duty cycle, chromatic balance, contrast (e.g., contrast polarity), spatial frequency, longitudinal chromatic aberration (LCA) at distance, field of view presented to the user, visual activity, eye movement, accommodation distances, and any other suitable visual experience parameters.

Implementations of the light coordinator can vary the user's experience according to the monitoring. For example, background distances, patterns, and colors can be varied over time. In another example, an object in the foreground can have varied dimensions, shape, color, distances, etc. In another example, light can be adjusted (e.g., using one or more lenses) to control the image shell created at the user's eye such that the curvature of the image shell and/or centration of the image shell is varied over time. In another example, the focal distance and/or fixation distance experienced by a user can be varied over time. In another example, peripheral characteristics experienced by the user, such as periphery curvature, contrast, and/or defocus cues can be varied over time. In another example, movement of images/objects displayed by the artificial reality system can be varied according to monitored eye movement/visual activity.

In another example, the rendered longitudinal chromatic aberration (LCA) experienced by a user can be varied over time. In another example, the spatial frequency (e.g., scene contrast at spatial frequency) experienced by a user can be varied over time. In another example, the contrast polarity experienced by a user can be varied over time. In another example, the Illumination wave shape/duty cycle experienced by a user can be varied over time. In another example, the luminance, spectrum, and/or chromatic balance experienced by a user can be varied over time.

In some implementations, a user may prefer a given object distance, text size, or other suitable visual parameter, and the user may curate the XR environment to accommodate these user preferences. However, extended exposure to certain visual experiences may have an undesirable impact, such as eye fatigue, improper eye health practices, or other suitable undesirable impacts. Implementations of the light coordinator can vary content and or optics presented/displayed by the XR system, such as by altering distance for virtual objects, text size, text/background color, light characteristics, and other suitable visual experience parameters. In some examples, user preferences for visual experiences can be determined according to monitored visual experience parameters, where future optical conditions are expected to comply with the determined user preferences without intervention. Implementations of the light coordinator can vary content and/or optics to be different from those defined by the user preferences to provide such an intervention and mitigate against undesirable impacts.

In some implementations, the light coordinator can compare the monitored visual experience parameter(s) to one or more criteria and adjust content and/or manipulate light that enters the user's eye to vary visual experience parameter(s) when the one or more criteria are met. The implemented variations can improve the user's experience with the XR system. For example, varying one or more of the monitored visual experience parameters can reduce eye fatigue or improve eye biology, visual acuity, and other aspects of user eyesight.

Implementations can manipulate the light that enters the user's one or more eyes (e.g., tracked pupil location) via the artificial reality system using one or more devices. For example, a gradient-index (GRIN) liquid crystal (LC) device with a patterned electrode can be used to selectively manipulate light that passes through the device. By controlling individual portions of the GRIN LC device, the light that enters a user's tracked pupil location can be manipulated to control optical parameters at the user's eye. For example, the optical properties of a GRIN LC lens (e.g., optical power) can be selectively tunable by applied electric fields. Implementations can apply electric fields and selectively tune portions of the GRIN LC device according to a user's tracked pupil location to manipulate light that enters the user's pupil and control optical parameters at the user's eye. U.S. patent application Ser. No. 17/173,177, filed Feb. 10, 2021, which is hereby incorporated by reference in its entirety, discloses examples of GRIN LC devices that can be used in some implementations.

In another example, a freeform varifocal optical assembly that includes an optical stack can be configured to enhance optical parameters at a user's eye, such as accommodation of one or both eyes. An example freeform varifocal optical assembly includes Pancharatnam-Berry phase (PBP) lenses, PBP gratings, polarization sensitive hologram (PSH) lenses, PSH gratings, metamaterials, or combinations thereof. The freeform varifocal optical assembly can be used to output an adjusted waveform from an arbitrary input waveform (independent of the optical system of a display device). The optical modules can also include a plurality of switchable polarization control optical components, such as a switchable retarder. By including a plurality of polarization sensitive lensing elements having different optical powers and controlling the plurality of switchable polarization control optical components (and the polarization sensitive lensing elements), the freeform varifocal optical system can provide focal power and aberration compensation. Implementations can adjust the switchable components of the freeform varifocal optical assembly to manipulate light that passes through the assembly and control optical parameters at the user's eye (e.g., according to a tracked pupil location). U.S. patent application Ser. No. 16/854,528, filed Apr. 21, 2020, which is hereby incorporated by reference, discloses examples of a freeform varifocal optical assembly that can be used in some implementations.

In yet another example, a varifocal optical system includes a plurality of optical elements, and at least some of the optical elements include a controllable focal power. For example, the varifocal optical system may include a plurality of lenses or gratings formed from liquid crystals, such as Pancharatnam-Berry Phase (PBP; also referred to as geometric phase) lenses, PBP gratings (also referred to as geometric phase gratings), polarization sensitive hologram (PSH) lenses, PSH gratings, and/or liquid crystal optical phase arrays. By controlling polarization of light incident on each respective lens or grating, and/or a state of the lens or grating, the optical system may be controlled to have a selected total optical power. Implementations can adjust the polarization of light incident on each respective lens or grating and/or a state of the lens or grating to adjust the total optical power of the system and control optical parameters at the user's eye. U.S. patent application Ser. No. 16/723, 152, filed Dec. 20, 2019, which is hereby incorporated by reference, discloses examples of varifocal optical systems that can be used in some implementations.

In a further example, a steered retinal display device can be used by implementations to control optical parameters at a user's eye by manipulating displayed pixels. For example, a steered retinal projection system can create an image on the retina that tracks with eye movement. The optical axis and image plane (optionally) can be steered according to eye/gaze tracking so that the angular, lateral and axial placement of the imaging forming light is both located properly in the eye as well as image corrected according to potential changes caused by steering. In an example, steering can be performed using combinations of conventional components and/or techniques that utilize mirrors or by other techniques such as optical components that change angle or displace through reflection, refraction, diffraction, etc. Such techniques may use electrically changed index of refraction, dispersion caused by illumination wavelength shift, polarization change, and/or electrically controlled mechanical motions.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer).

Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that control light in an artificial reality system according to tracked user conditions. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, light coordinator 164, and other application programs 166. Memory 150 can also include data memory 170 that can include, e.g., users' health data, user eye data, user preferences, historical user visual experiences, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
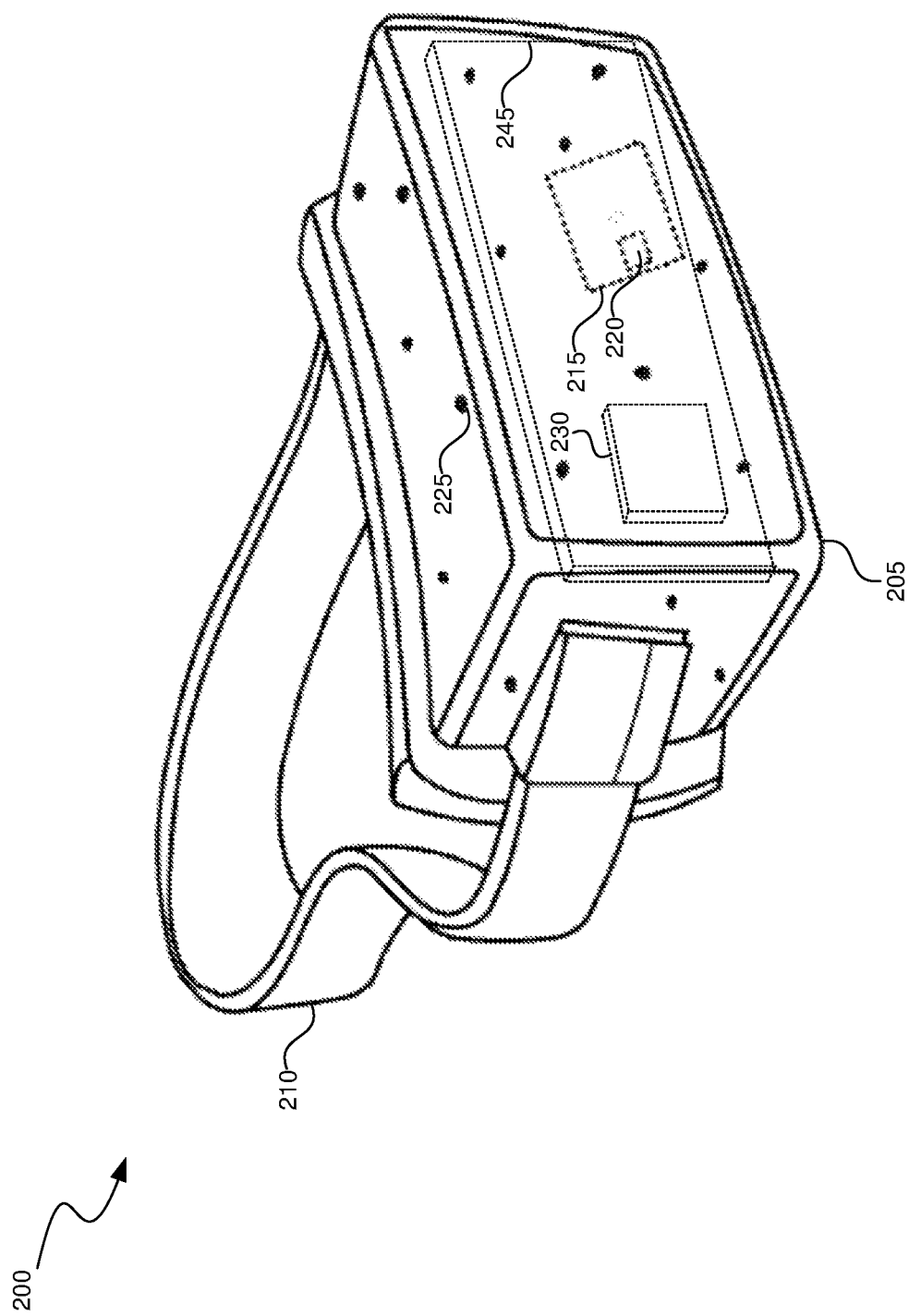
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
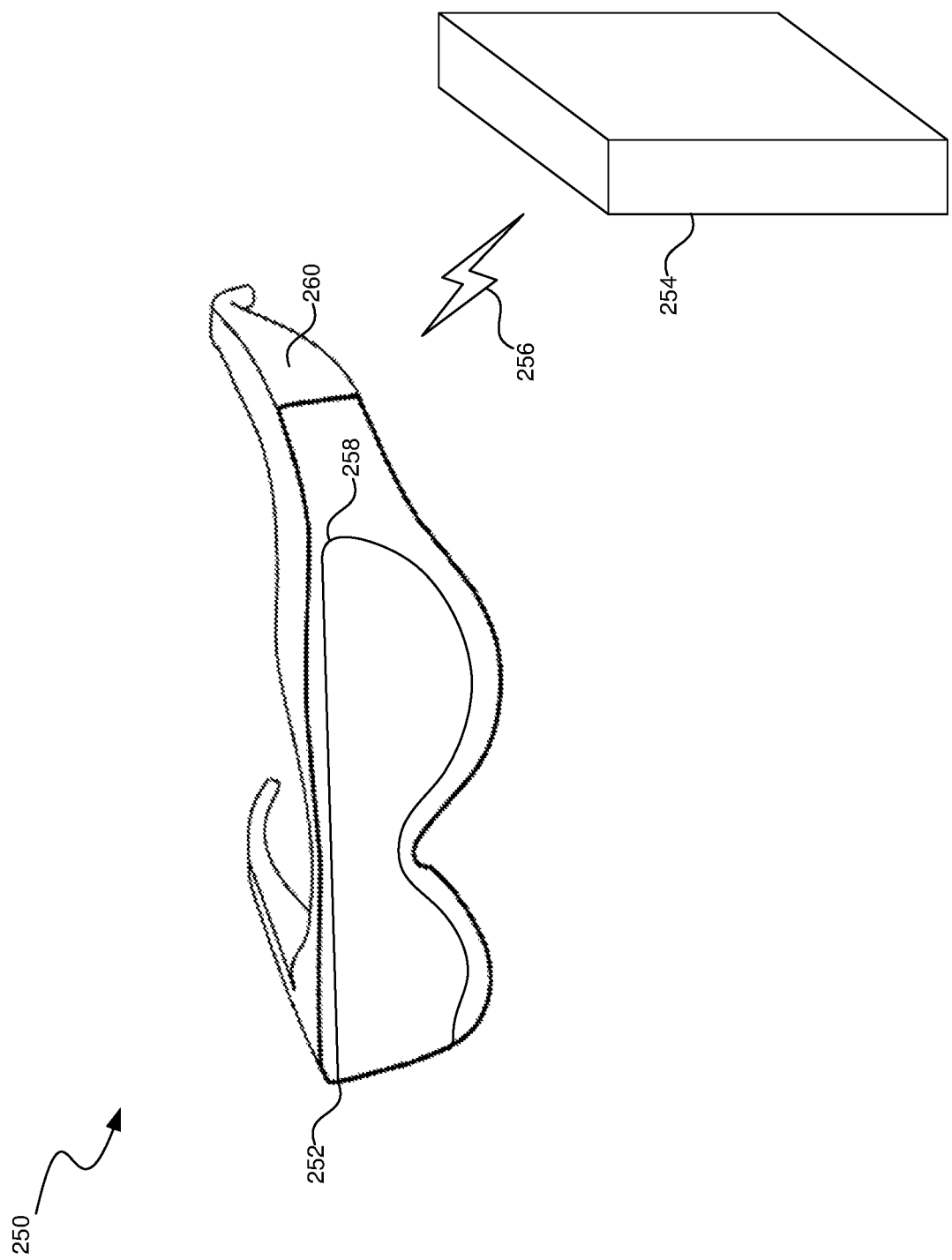
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
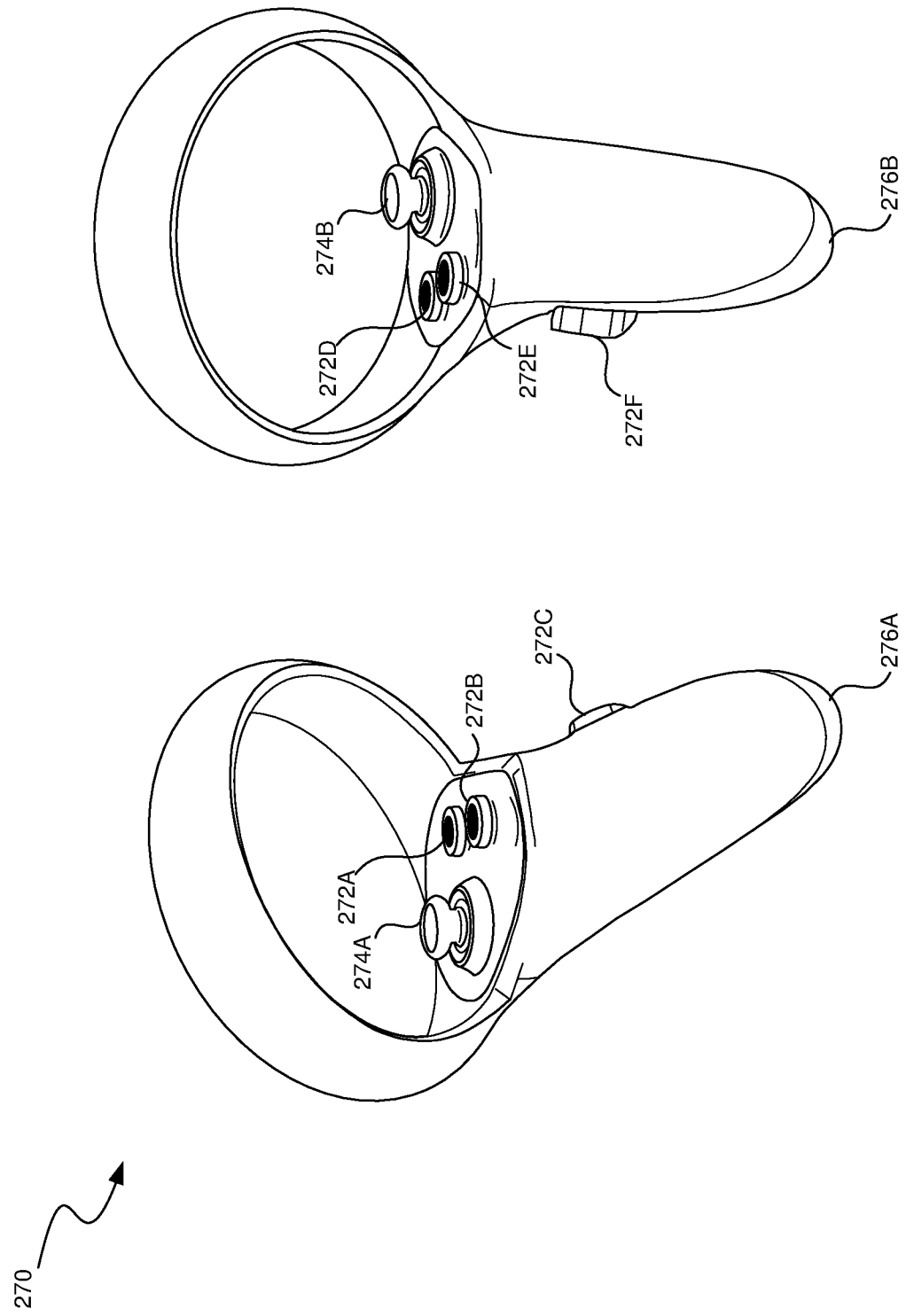
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
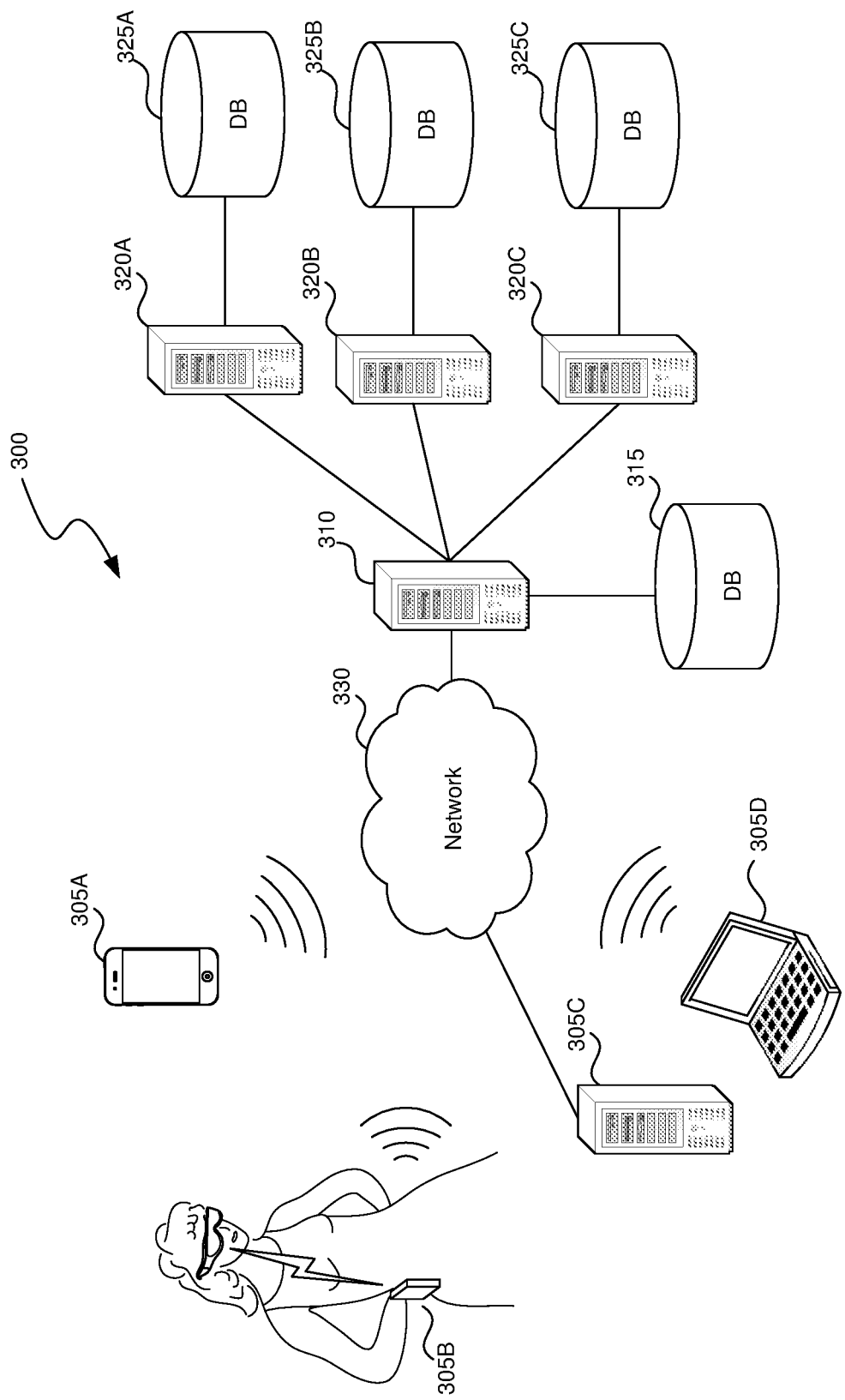
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
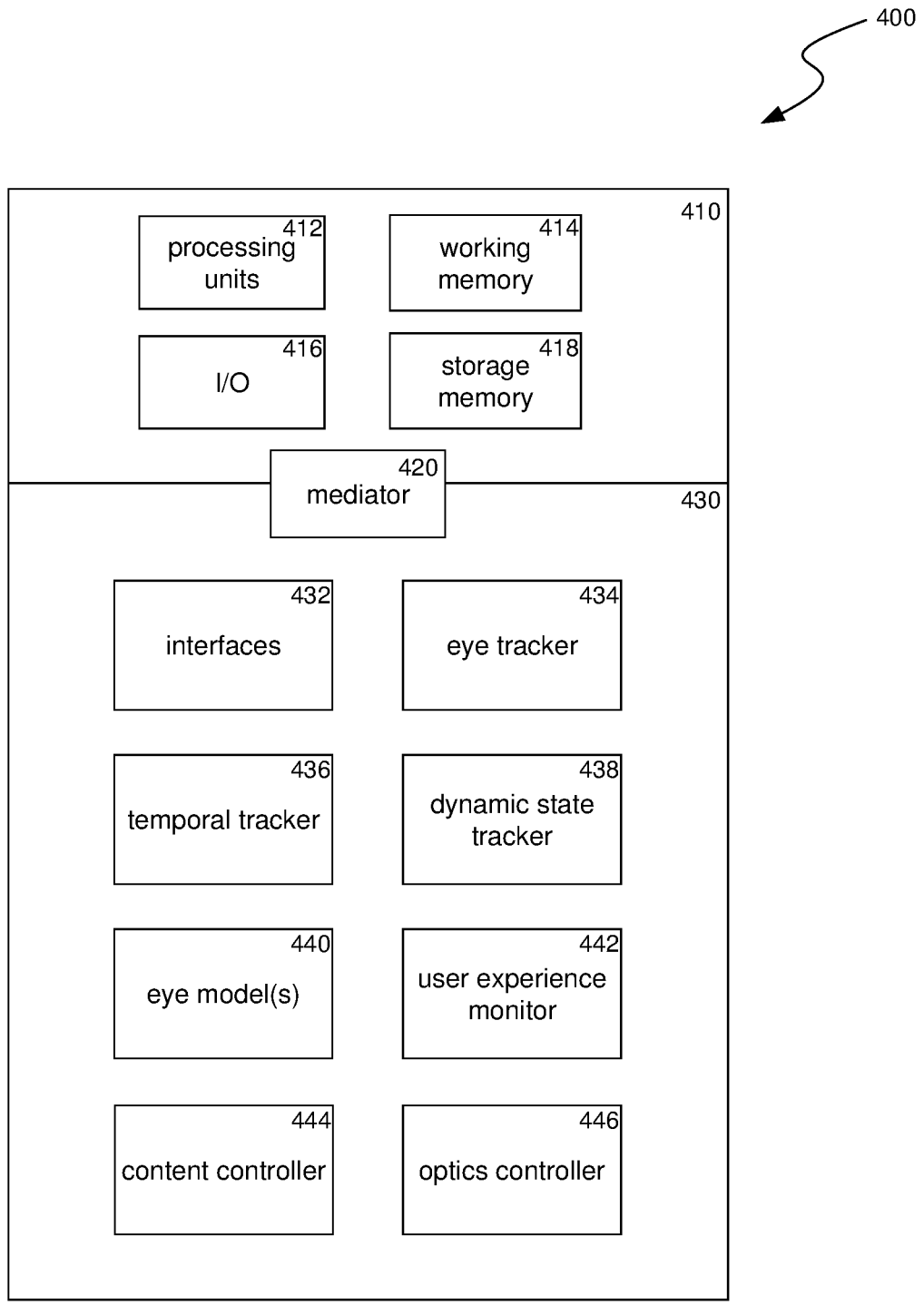
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for controlling light using an artificial reality system according to tracked user conditions. Specialized components 430 can include eye tracker 434, temporal monitor 436, dynamic state tracker 438, eye model(s) 440, user experience monitor 442, content controller 444, optics controller 446, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Eye tracker 434 can track the movement of one or more of a user's eyes. For example, eye tracker 434 can track the location of a pupil of a user's eye within the eye box. In some implementations, eye tracker 434 can track both the location of a user's eye and the user's gaze (according to head positioning). Eye tracker 434 can track the user's eye/head movement using one or more sensors, such as one or multiple cameras. In some implementations, the visual data can be processed by one or more machine learning models trained to perform eye/gaze tracking. The machine learning models can be a trained neural network (e.g., a LSTM, convolutional network, or other network), or any other suitable machine learning model configured to track user eye movements. Additional details on eye tracker 434 are provided below in relation to blocks 804 of FIG. 8.

Temporal monitor 436 can monitor temporal conditions for a user. The temporal conditions can include the time of day, day of week, day of the month, season of the year, user sleep cycle, user activity level, type of user activity, or any other suitable temporal condition. In some implementations, a sensor (e.g., wearable sensor, accelerometer, gyroscope, etc.) can provide user data to temporal monitor 436, such as the user's steps, activity level, sleep cycle, and the like. Temporal monitor 436 can include clock and calendar functionality (or can receive clock and calendar data) to monitor temporal conditions for the user. Additional details on temporal monitor 436 are provided below in relation to blocks 902, 904, 908, and 912 of FIG. 9.

Dynamic state tracker 438 can track the movement of one or more of a user's eyes and other suitable dynamic states for implementations of the eye model. Example dynamic state parameters tracked by dynamic state tracker 438 include pupil size, pupil position in an eye box, gaze vector/fixation distance, accommodative state, vergence state/distance, time of day, recent time of fixation at distance, background visual distance/intensity (e.g., for AR/MR), and other suitable dynamic state parameters.

Dynamic state tracker 438 can track the user's eye/head using one or more sensors, such as one or multiple cameras. In some implementations, the visual data can be processed by one or more machine learning models trained to perform eye tracking, gaze tracking, eye monitoring, or other suitable tasks. The machine learning models can be a trained neural network (e.g., a LSTM, convolutional network, or other network), or any other suitable machine learning model configured to monitor user eye parameters. In some implementations, dynamic state tracker 438 can include clock/calendar functionality (or can receive clock and calendar data) to monitor temporal conditions for the user. Additional details on dynamic state tracker 438 are provided below in relation to blocks 1008 of FIG. 10.

Eye model(s) 440 can be any suitable 3D, algorithmic, or numerical model that maps user eye characteristics. For example, eye model(s) 440 can be a regression model, machine learning model, numerical algorithm, 3D model generated from machine learning outputs, and/or any other suitable model or combination of models. Example user characteristic variables for eye model(s) 440 can include user age, visual optics/refractive error (e.g., spherical, across field), axial length, choroidal thickness, ocular curvature, phoria at near/far, and the like. In some implementations, a personalized eye model 440 for a user can receive the user's characteristics and output optical control parameters for the user. In this example, the optical control parameters can be specific values or value ranges for one or more optical parameters experienced at the user's eye, and the XR system can manipulate light that enters the user's eye (e.g., via optics controller 440 and the monitored dynamic state parameters) in accordance with the optical control parameters.

In some implementations, eye model(s) 440 can map user characteristics and dynamic state parameters to optical parameter controls. For example, a personalized eye model 440 for a user can receive the user's characteristics and monitored dynamic state parameters (e.g., from dynamic state tracker 438) for the user, and output optical control parameters. In this example, the optical control parameters can be specific values or value ranges for one or more optical parameters experienced at the user's eye, and the XR system can manipulate light that enters the user's eye (e.g., via optics controller 446) in accordance with the optical control parameters. Example dynamic state parameter variables for eye model(s) 440 can include pupil size, pupil position (e.g., in an eye box or as mapped by a 3D model of the user's eye(s)), gaze vector/fixation distance, accommodative state, vergence state/distance, time of day, recent time of fixation at distance, background visual distance/intensity (e.g., for AR/MR), and other suitable dynamic state inputs.

In some implementations, developing eye model(s) 440 can include manual diagnostics and/or testing to determine optical tunings for users with particular characteristics. In this example, eye model(s) 440 can be used to map particular user characteristics to optimal control parameters for a user. In another example, one or more user characteristics (e.g., physical properties of the eye, axial length, etc.) can be used to generate a 3D model of the user's eye. Using the 3D model and other characteristics for the XR system (e.g., lens distance from a user's eye, etc.) one or more light/display/lens conditions and resulting optical parameters at the user's eye can be simulated to determine optimal control parameters. In some implementations, one or more machine learning models can be trained/configured to receive, as input, factors such as age, vision history (e.g., how many hours a day the user looks at a screen), pupil size, and the like, and predict a user's eye characteristics (e.g., axial length, etc.). In this example, the predicted eye characteristics can be used to generate the 3D model for the user's eye and/or perform simulations to determine optimal control parameters. Additional details on eye model(s) 440 are provided below in relation to blocks 1002 and 1044 of FIG. 10.

User experience monitor 442 can monitor the visual experiences for a user, such as the parameters of the user's visual experiences with the XR system. For example, user experience monitor 442 can monitor the XR display to detect background characteristics experienced by the user over time (e.g., patterns, colors, distance, aggregated defocus distance, etc.); foreground characteristics experienced by the user over time (e.g., object shape, dimensions, colors, distance, etc.); luminance, spectrum, and chromatic balance experienced by the user over time; illumination wave shape/duty cycle experienced by the user over time; contrast (e.g., contrast polarity) experienced by the user over time; spatial frequency experienced by the user over time; longitudinal chromatic aberration (LCA) experienced by the user over time; and other suitable visual experience parameters related to displayed content.

In some implementations, user experience monitor 442 can also monitor optical parameters created at the user's eye by the XR system, such as eye image shell characteristics (e.g., image shell curvature, centration, etc.), periphery characteristics (e.g., periphery curvature, contrast, defocus cues, etc.), focal distance, eye movement, accommodation distances, and any other suitable optical parameters. For example, user experience monitor 442 and eye model(s) 440 can, in combination, simulate optical parameters created at the user's eye by the XR system and monitor these simulated optical parameters over time.

User experience monitor 442 can monitor a user's visual experience over a defined duration of time, such as over a day, a week, a month, a year, and the like. For example, one or more visual experience profiles can be populated with the visual experience data monitored for a user, such as visual experience profiles associated with different durations of time. Additional details on user experience monitor 442 are provided below in relation to block 1104 of FIG. 11.

Content controller 444 can control content displayed by the XR system, for example based on the monitored visual experience parameters. In some implementations, a criteria can be defined, such as a criteria for an individual monitored visual experience parameter or a combination of monitored visual experience parameters. When a particular visual experience parameter related to content meets a defined criteria, content controller 444 can adjust the content displayed to a user by the XR system to vary the particular visual experience parameter. For example, a background characteristics criteria can define a threshold period of time for a user to experience the same background features. When a monitored profile for the user indicates that the background characteristics criteria has been met, content controller 444 can adjust the background features to provide the user a varied experience (e.g., adjust the background color, the distance, pattern, etc.). Other monitored visual experience parameters can have defined criteria that trigger adjustments to content to vary the visual experience parameters. Additional details on content controller 444 are provided below in relation to block 1110 and 1112 of FIG. 11.

Optics controller 446 can control light that enters the user's eye(s) via the XR system. For example, optics controller 446 can control one or more optical devices (e.g., lenses) configured to manipulate light that enters the user's eyes. In some implementations, physical characteristics of the lenses can be adjusted by optics controller 446 to control light that passes through the lenses. For example, electric fields can be selectively applied to a GRIN LC lens to selectively tune portions of the lens, manipulate light that passes through the lens, and control optical parameters at the user's eye. In another example, switchable components of a freeform varifocal optical assembly and/or optical elements of a varifocal optical system with controllable focal power can be selectively controlled to manipulate light that passes through the lens(es), and control optical parameters at the user's eye.

In another example, optics controller 446 can control a display that emits light that enters the user's eye. In some implementations, characteristics of the emitted light, such as the luminance, spectrum, chromatic balance, and other suitable characteristics, can be controlled by optics controller 446. In some implementations, optics controller 446 can receive eye/gaze information from eye tracker 434 and control the light that enters the user's eye according to the eye/gaze information. In some implementations, optics controller 446 can receive temporal conditions from temporal monitor 436 and control the light that enters the user's eye according to temporal conditions.

In some implementations, optics controller 446 can receive output from eye model(s) 440 (e.g., control parameters) and control the light that enters the user's eye according to the output. In some implementations, optics controller 446 can receive output from eye model(s) 440 and control the light that enters the user's eye according to the output and tracked dynamic state parameters for the user (e.g., pupil location, pupil size, etc.). Implementations of eye model(s) 440 can be personalized to configure the XR system to achieve optical light conditions/optical parameters for the individual eye characteristics/tracked dynamic state parameters for a user. Implementations of optics controller 446 can control the light conditions presented to a user by the XR system to achieve these optimizations.

In some implementations, a criteria can be defined, such as a criteria for an individual monitored visual experience parameter or a combination of visual experience parameters. When a particular visual experience parameter related to optics (e.g., optical parameters experienced at the user's eye, light characteristics, etc.) meets a defined criteria, optics controller 446 can adjust the optics of the light presented to a user by the XR system to vary the particular visual experience parameter. For example, focal distance criteria can define a threshold period of time for a user to experience a same focal distance. When a monitored profile for the user indicates that the focal distance criteria has been met, optics controller 446 can adjust the focal distance to provide the user a varied experience. Other monitored visual experience parameters can have defined criteria that trigger adjustments to light/optics presented to a user to vary the visual experience parameters. Additional details on optics controller 446 are provided below in relation to blocks 806 and 818 of FIG. 8 and blocks 912 and 914 of FIG. 9, and block 1010 of FIG. 10, and blocks 1114 and 1116 of FIG. 11.

Figure 5:
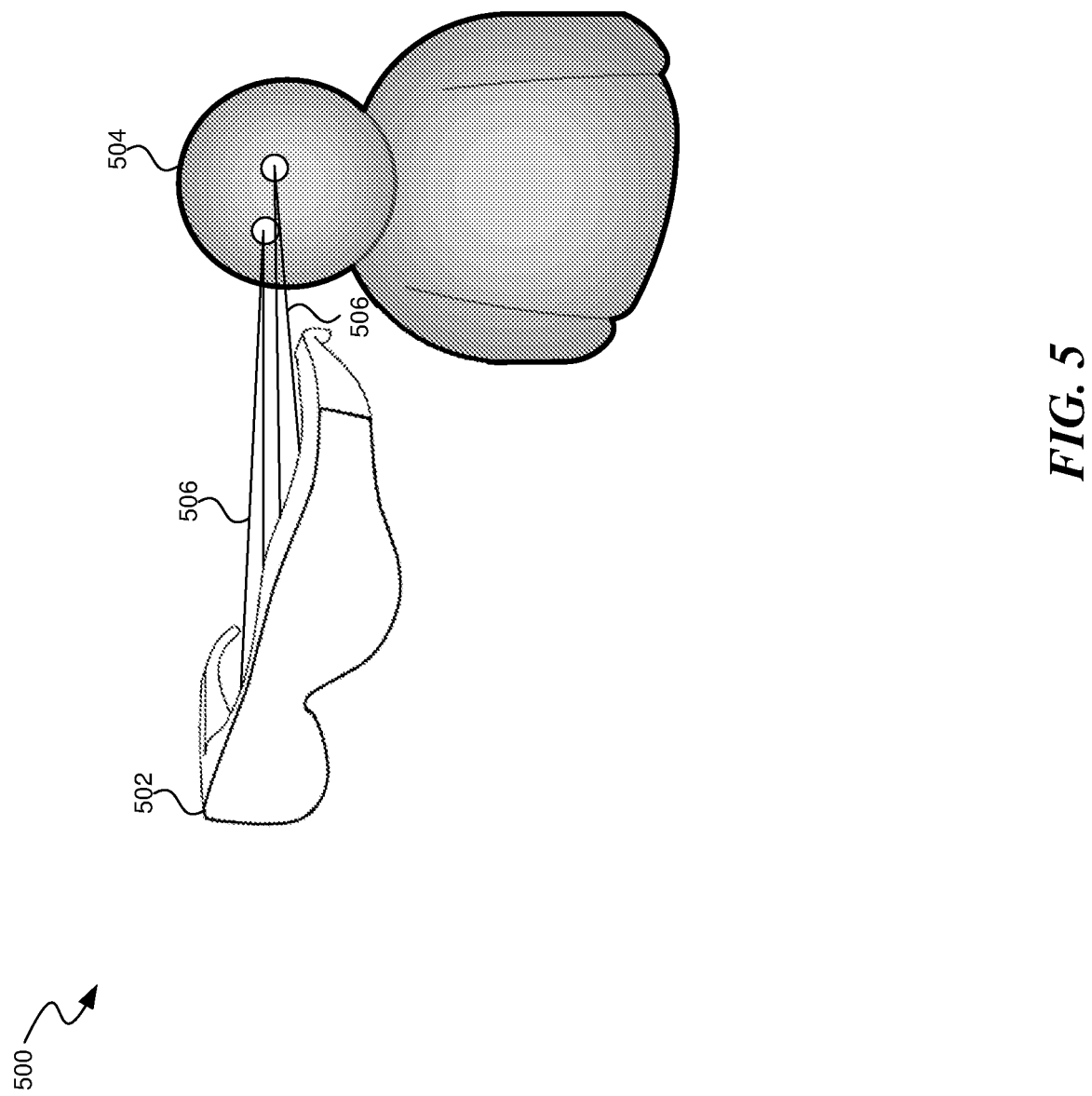
FIG. 5 is a conceptual diagram illustrating light entering a user's eye via an artificial reality system.

Implementations adjust the light that enters a user's eyes via a head-mounted display (HMD) that provides the user an immersive XR experience. FIG. 5 is a conceptual diagram illustrating light entering a user's eye via an XR system. Diagram 500 includes HMD 502, user 504, and light 506. In some implementations, HMD 502 comprises a display that emits light 506 to the eyes of user 504 to generate an immersive XR environment experienced by the user, such as a VR environment (or AR/MR environment generated using captured video). In some implementations, HMD 502 is configured such that real-world light passes through the device and additional light is generated by the device such that light 506 that enters the eyes of user 504 and generates the immersive XR environment is a mix of real-world light and light generated by HMD 502, such as an AR or MR environment.

An optics controller and/or eye model at HMD 502 can control the light that enters the eyes of user 504 according to user characteristics and dynamic state parameters tracked for user 504 (e.g., tracked characteristics of the eyes of user 504). For example, because HMD 502 is some distance from the user's eye(s), eye/pupil positioning at different locations in the eye box can impact optical parameters at the user's eye (e.g., image shell characteristics, or other optical parameters). The optics controller at HMD 502 can control lenses at HMD 502 and/or light emitted from a display at HMD 502 according to the tracked position of a user's eye/pupil and/or output from the eye model.

For example, electric fields can be selectively applied to a GRIN LC lens (that is part of HMD 502) to selectively tune portions of the lens, manipulate light that passes through the lens, and control optical parameters at the user's eye. In another example, switchable components of a freeform varifocal optical assembly and/or optical elements of a varifocal optical system with controllable focal power can be selectively controlled to manipulate light that passes through the lens(es), and control optical parameters at the user's eye. In some implementations, the optics controller at HMD 502 can control light that enters the eyes of user 504 according to monitored temporal conditions. For example, characteristics of the light emitted from HMD 502 can be controlled, such as the spectrum, luminance, chromatic balance, and other suitable light characteristics.

Figure 6:
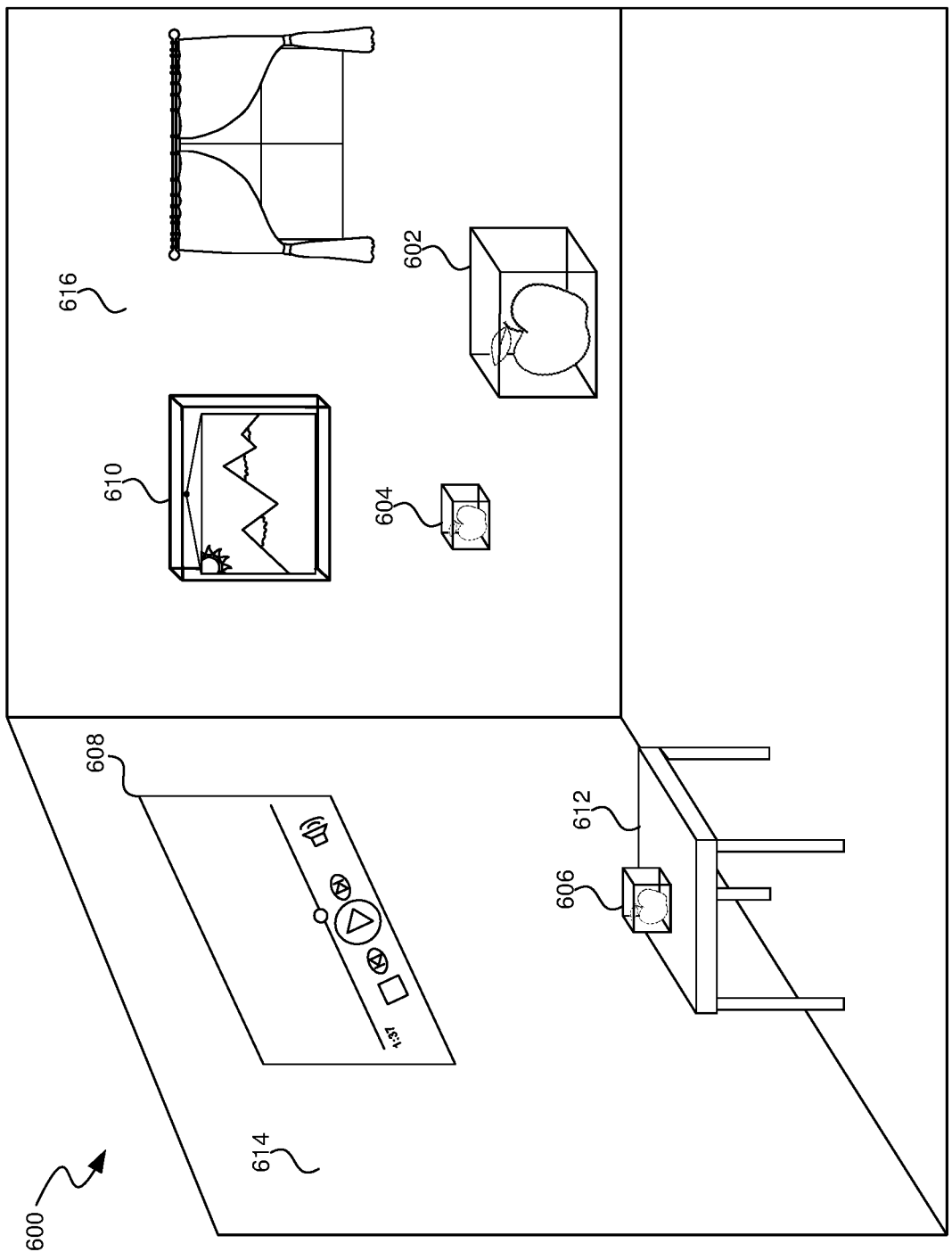
FIG. 6 is a conceptual diagram illustrating an artificial reality environment with virtual objects.

FIG. 6 is a conceptual diagram illustrating an artificial reality environment with virtual objects. Environment 600 includes virtual objects 602, 604, 606, 608, and 610, and surfaces 612, 614, and 616. HMD 502 of FIG. 5 can generate environment 600 for user 504. Environment 600 can be a virtual reality environment, mixed reality environment, augmented reality environment, or any other suitable immersive environment.

Virtual objects 602, 604, 606, 608, and 610 are positioned at different locations in the room depicted by environment 600, at different viewing distances, and having different dimensions. For example, virtual object 608 is a two-dimensional panel displayed on surface 614 (e.g., a sidewall) while virtual object 602 is a three-dimensional floating object. These virtual objects can also be different colors, stationary or moving, or have other suitable differences. The eyes of user 504 can experience different optical parameters depending on which virtual object is in focus for the user. Implementations of an optics controller at HMD 502 can adjust the virtual object that is displayed to user 504 to control the optical parameters at user 504's eye(s).

User 504 can also experience different visual parameters depending on which virtual object is displayed to the user. Implementations of a content controller at HMD 502 can adjust the virtual object that is displayed and/or adjust other suitable aspects of environment 600 to vary the visual experience provided to user 504. For example, the spectrum for light experienced by user 504 from the XR system can be monitored, and it can be determined that this monitored visual experience parameter meets a criteria defined for the parameters. In response, the colors for one or more of virtual objects 602, 604, 606, 608, and 610 and/or surfaces 612, 614, and 616 can be adjusted to vary the user's experience. In other examples, virtual objects can be moved closer or farther from the user's presence in environment 600, the dimension or shape of virtual objects can be adjusted, or other suitable visual experience parameters can be varied.

Figure 7:
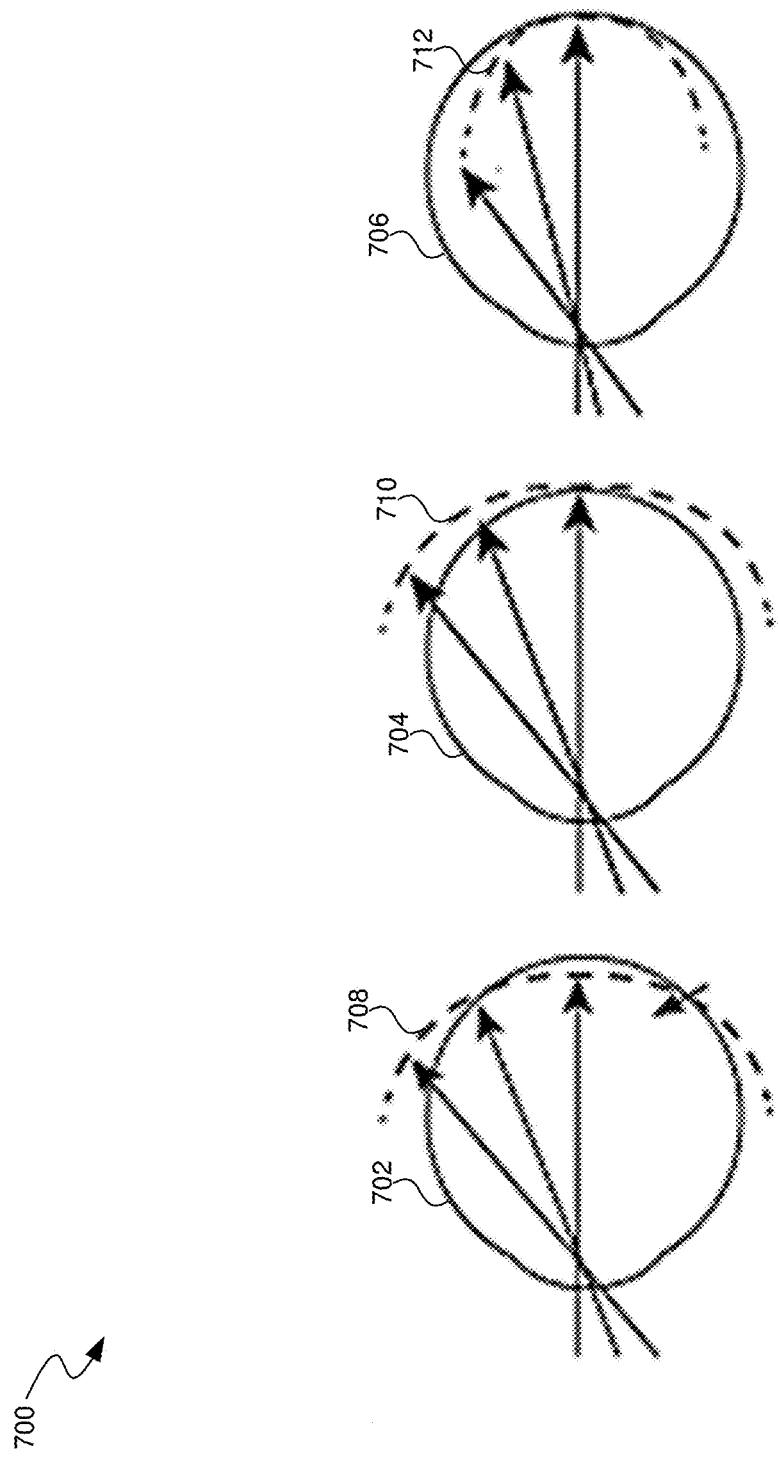
FIG. 7 is a conceptual diagram illustrating variations of optical conditions at a user's eye.

FIG. 7 is a conceptual diagram illustrating variations of optical conditions at a user's eye. Diagram 700 includes eyes 702, 704, and 706, and image shells 708, 710, and 712, where the arrows illustrate the focal distance for portions of the image shells. Image shell 708 depicts a conventional out-of-focus image shell. For example, image shell 708 does not fall on almost any part of the retinal plane of eye 702. Image shells 710 and 712 depict alterations to image shell 708 to correct for the distortion. However, the curvature of image shells 710 and 712 may still produce unclear images. In particular, image shells 710 and 712 may produce out of focus peripheral images because portions of the image shell do not align with the retinal plane edges of eyes 704 and 706. Implementations manipulate light that enters a user's eye to control optical parameters at the user's eye, such as characteristics of the image shell (e.g., curvature, centration, etc.), characteristics of the periphery, the optical axis, focal distance at eccentricity, modulation transfer function (MTF) at eccentricity, myopic defocus cue in periphery, contrast/peripheral contrast, Illumination wave shape/duty cycle, and other suitable optical parameters. Example results of such manipulations are to produce an image shell that more closely aligns with the entire retinal plane, produce one or more defocus cues in the user's periphery, or otherwise generate an image shell with properties to optimize a user's vision and/or eye biology.

Those skilled in the art will appreciate that the components illustrated in FIGS. 1-7 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 8:
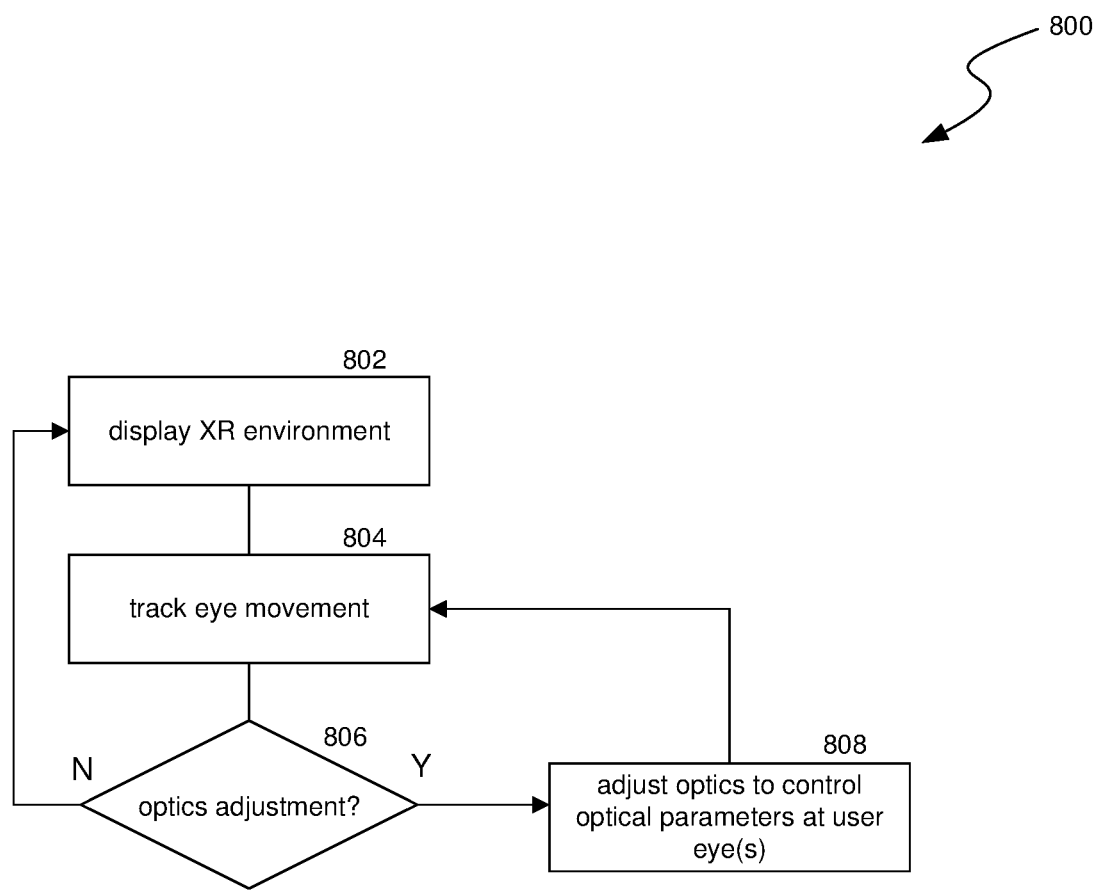
FIG. 8 is a flow diagram illustrating a process used in some implementations of the present technology for controlling optical parameters at a user's eye using an artificial reality system and tracked user conditions.

FIG. 8 is a flow diagram illustrating a process used in some implementations of the present technology for controlling optical parameters at a user's eye using an XR system and tracked user conditions. In some implementations, process 800 can be used to manipulate the light that enters a user's eye(s) and control optical parameters at the user's eye(s). Process 800 can be triggered when an XR system presents an XR environment to a user. Implementations of process 800 can be performed by an XR system, such as an HMD.

At block 802, process 800 can display an XR environment to a user. For example, an HMD of an XR system can display an immersive XR environment to a user. The XR system can display the XR environment to a user in any other suitable manner. At block 804, process 800 can track eye movement by the user. For example, the XR system can include one or more sensors to track a user's eye movements, such as the pupil positions for one or more of the user's eyes and/or the user's gaze.

At block 806, process 800 can determine whether optical adjustment should be performed based on the tracked eye/gaze movement. For example, it can be determined that optical adjustment should be performed for certain pupil positions in the eye box (e.g., edges of the eye box, other suitable positions) and/or certain eye gaze movements/positions. In some implementations, when the pupil moves to an edge of the eye box, the optics for light entering the user's eye via the pupil can be impacted. Accordingly, it can be determined that optical adjustment should be performed when eye tracking detects certain eye/pupil/gaze conditions. When it is determined that optical adjustment should be performed, process 800 progresses to block 808. When it is determined that optical adjustment should not be performed, process 800 loops back to block 802, where the XR environment continues to be displayed to the user.

At block 808, process 800 adjusts optics to control optical parameters at the user's eyes. For example, one or more devices at the XR system (e.g., lenses) can be controlled to adjust the light entering the user's eye. In another example, light emitted by the XR system can be controlled to adjust the light entering the user's eye. In some implementations, adjusting the light entering the user's eye controls one or more of a focal distance of one or more objects displayed to a user, one or more defocus cues created at the user's eye, a wave shape for the light entering the user's eye, a chromatic balance of the light entering the user's eye, luminance, a field of view displayed to the user, an image shell created at the user's eye, a curvature of the image shell created at the user's eye, a peripheral curvature of the image shell created at the user's eye, a centration of curvature of the image shell created at the user's eye, peripheral myopic defocus cues in the user's periphery, peripheral contrast, or any combination thereof.

In an example, controlling an XR system to adjust light entering the user's eye can include selectively applying an electric field to a GRIN LC lens to selectively tune portions of the lens, manipulate light that passes through the lens, and control optical parameters at the user's eye. In another example, switchable components of a freeform varifocal optical assembly and/or optical elements of a varifocal optical system with controllable focal power can be selectively controlled to manipulate light that passes through the lens(es), and control optical parameters at the user's eye.

In some implementations, the optical axis is adjusted according to the tracked eye location/eye gaze. For example, the optical axis can be controlled to maintain a consistent image shell curvature on a user's retina in the presence of user eye/gaze movement. In some implementations, a "swimming effect" caused by optical components of the XR system can be mitigated by the adjustments. For example, a swimming effect can cause objects to appear distorted when a user's head/eye(s) move as light is entering the user's eye(s) via a different portion of the optical system/lens. The swimming effect can be mitigated by implementations, for example by controlling the focal distance (at center of fixation), the image shell curvature, and/or the image shell centration.

Figure 9:
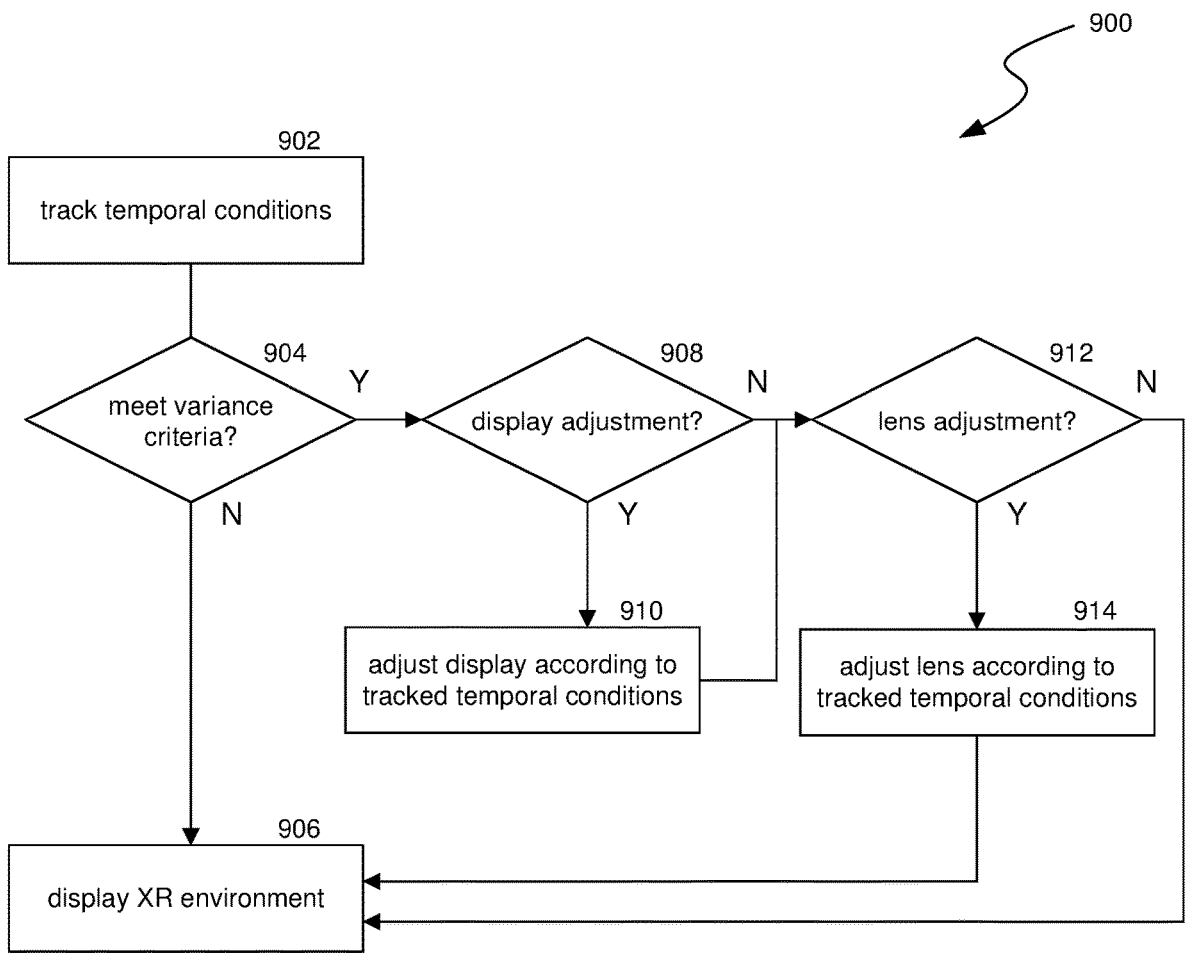
FIG. 9 is a flow diagram illustrating a process used in some implementations of the present technology for controlling optical parameters at a user's eye using an artificial reality system according to monitored temporal conditions.

FIG. 9 is a flow diagram illustrating a process used in some implementations of the present technology for controlling optical parameters at a user's eye using an XR system according to monitored temporal conditions. In some implementations, process 900 can be used to manipulate the light that enters a user's eye(s) and to control optical parameters at the user's eye(s). Process 900 can be triggered when an XR system presents an XR environment to a user. Implementations of process 900 can be performed by an XR system, such as an HMD.

At block 902, process 900 can track temporal conditions for a user. Example temporal conditions that are tracked include time of day, day of week, day of the month, season of the year, user sleep cycle, user activity level, user activity type, or any other suitable temporal condition. In some implementations, one or more devices (e.g., a wearable device with a sensor) can perform tracking functions and transmit one or more of the tracked temporal conditions to the XR system.

At block 904, process 900 can determine whether a variance criteria is met by the temporal conditions. An example variance criteria can include timing parameters related to a user's sleep cycle. The light exposed to a user can impact the user's circadian rhythms. Accordingly, when the time of day is within a threshold duration from a user's sleep cycle (e.g., bedtime), the variance criteria can be met.

In another example, the variance criteria can be defined times of the day. A user may be impacted by luminance, spectrum, chromatic balance, and/or other light characteristics from the XR system (e.g., light that enters the user's eye via the XR system) in different ways according to the time of day and/or amount of natural light exposed to the user. Accordingly, the variance criteria can be met during predefined times of day and/or predefined times of day during predefined seasons.

When the variance criteria is met, process 900 can progress to block 908. When the variance criteria is not met, process 900 can progress to block 906. At block 906, process 900 can display an XR environment to the user. For example, an HMD of an XR system can display an immersive XR environment to a user. The XR system can display the XR environment to a user in any other suitable manner.

At block 908, process 900 can determine whether a display adjustment should be performed. For example, when the variance criteria is met, one or more adjustments can be made to control the light the enters the user's eye(s) via the XR system. In some implementations, the light that enters the user's eye(s) via the XR system is emitted by the XR system. Depending on the tracked temporal conditions and/or the met variance criteria, one or more display adjustments can be performed.

For example, when the variance criteria that is met is a time of day proximate to the user's sleep cycle, it can be determined that a display adjustment should be performed to mitigate an impact on the user's circadian rhythm. In another example, when the variance criteria met is a predefined time of day, it can be determined that a display adjustment should be performed to optimize characteristics of light emitted by the XR system for the time of day.

When it is determined that a display adjustment should be performed, process 900 progresses to block 910. When it is determined that a display adjustment should not be performed, process 900 progresses to block 912. At block 910, process 900 can adjust a display presented to a user according to the tracked temporal conditions. For example, characteristics of light emitted by the XR system, such as the luminance, spectrum, chromatic balance, any other suitable light characteristics can be adjusted according to the temporal conditions.

At block 912, process 900 can determine whether a lens adjustment should be performed. For example, a lens adjustment can control characteristic of image shell generated at a user's eye (e.g., image shell curvature, image shell centration, optical axis, etc.), characteristics of the optical parameters at a user's periphery (e.g., peripheral defocus cues, peripheral contrast, peripheral curvature), and other suitable optical parameters at the user's eye. These optical parameters can impact a user's vision, eye biology, and/or eye fatigue. Accordingly, lens adjustments can be performed to improve the impact the XR system has on the user's eye. In some implementations, it can be determined that a lens adjustment should be performed according to one or more defined times of day.

When it is determined that a lens adjustment should be performed, process 900 progresses to block 914. When it is determined that a lens adjustment should not be performed, process 900 progresses to block 906, where the XR environment is displayed to a user according to any performed display adjustment (or any other suitable adjustment).

At block 914, process 900 can adjust one or more lenses of the XR system according to the tracked temporal conditions. For example, a lens adjustment can control one or more of focal distance, MTF (at eccentricity), field of view, image shell curvature, image shell centration, peripheral defocus cues, peripheral contrast, or any other suitable optical parameters at the user's eye. In some implementations, the curvature of an image shell, peripheral defocus cues, and/or MTF can be controlled according to the monitored temporal conditions, such as the time of day.

In an example, adjusting one or more lenses of the XR system can include selectively applying an electric field to a GRIN LC lens to selectively tune portions of the lens, manipulate light that passes through the lens, and control optical parameters at the user's eye. In another example, switchable components of a freeform varifocal optical assembly and/or optical elements of a varifocal optical system with controllable focal power can be selectively adjusted to manipulate light that passes through the lens(es), and control optical parameters at the user's eye. After block 914, process 900 can progress to block 906 and display the XR environment to the user using any suitable adjustments performed at blocks 910 and 914.

Figure 10:
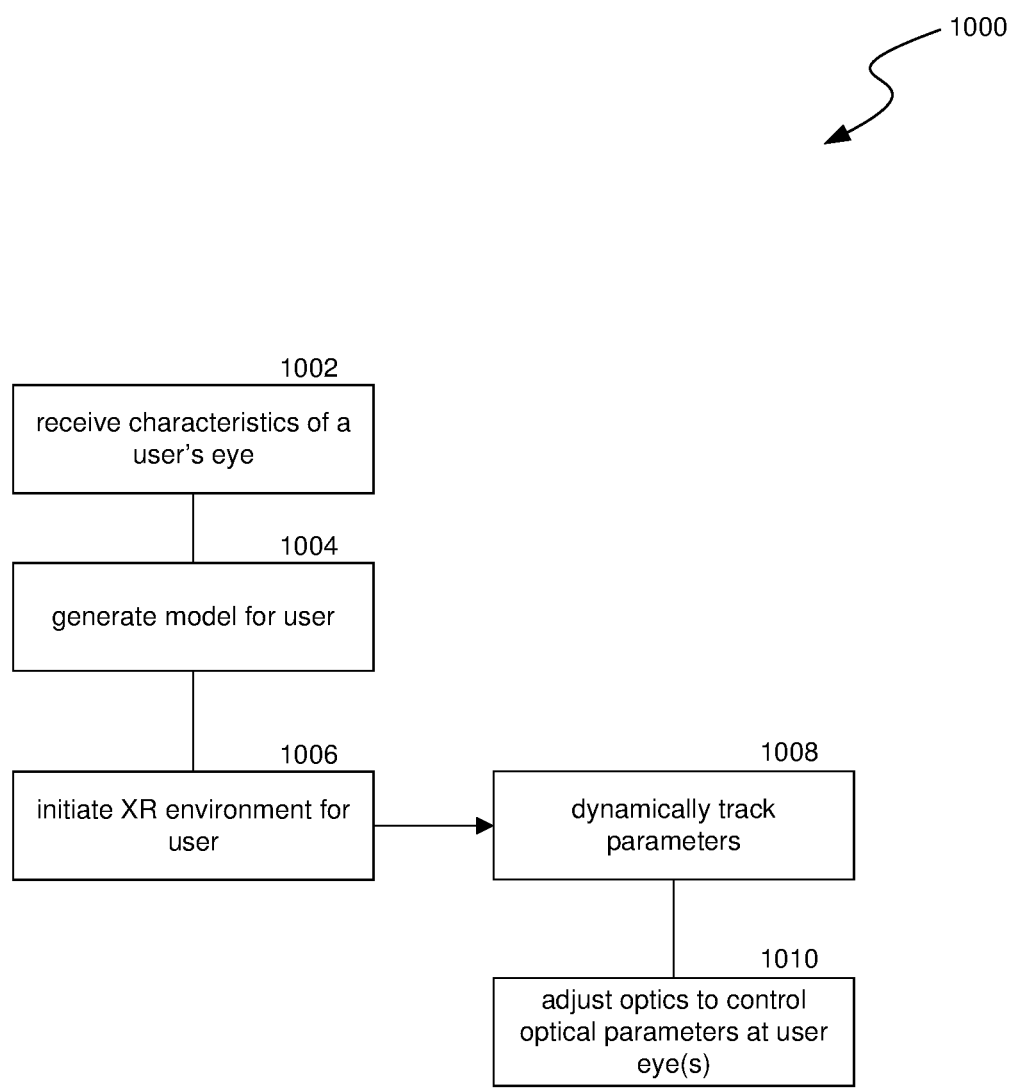
FIG. 10 is a flow diagram illustrating a process used in some implementations of the present technology for controlling optical parameters at a user's eye using a personalized eye model.

FIG. 10 is a flow diagram illustrating a process used in some implementations of the present technology for controlling optical parameters at a user's eye using a personalized eye model. In some implementations, process 1000 can be used to manipulate the light that enters a user's eye(s) and control optical parameters at the user's eye(s). Implementations of process 1000 can be performed by an XR system, such as an HMD.

At block 1002, process 1000 can receive characteristics of a user's eye. Example user eye characteristics include visual optics/refractive error (e.g., spherical, across field), axial length, choroidal thickness, ocular curvature, phoria at near/far, and the like. In some implementations, other user characteristics are also received with the user eye characteristics, such as user age, medical history, and other suitable user information. In some implementations, user characteristics include spherical refraction or degree of myopia (e.g., in diopters) or 'SR', degree of accommodation (e.g., in diopters) or 'Acc', age (e.g., in years).

In some cases, eye characteristics can be determined from user records e.g., medical records, eye prescriptions, etc., that include a user's eye information. In additional cases, one or more sensors (e.g., cameras) can capture data for the user's eyes (e.g., under different lighting conditions/eye circumstances, using different light types, using depth sensors, etc.), and the captured sensor data can be processed to generate a user's eye characteristics. In further cases, one or more eye tests can be administered, and the user's eye characteristics can be included in the eye test results.

At block 1004, an eye model can be generated for the user. In some cases, process 1000 can use the eye characteristics to determine physical dimensions of the eye and generate a corresponding 3D model. Simulated light can then be applied to this 3D model, according to known effects of light on human eyes, to determine optimized control parameters for the user's eyes. In some cases, the eye characteristics can be applied to a machine learning model trained to take eye characteristics (which may include the sensor data and/or higher order results from such sensor data such as the aforementioned 3D eye model) and output optimized optical control parameters. For example, recorded medical data across a set of users who have logged different kinds of light exposure can be used as training data for such a machine learning model. Thus, the generated eye model can take as input the received user characteristics (which may be converted into a 3D model) and output optimized control parameters that support optimal optical parameters experienced at the user's eye(s). Such a personalized eye model can be a 3D model with corresponding physics rules, a regression model, a machine learning model, an algorithm, a lookup table, and/or any other suitable model or combination of models.

In some implementations, the eye model can be generated using model data that represents healthy and/or optimized user experiences. For example, the model data can include sets of data that match favorable value ranges for one or more optical parameters experienced at the user's eye (e.g., an image shell created at the user's eye, a curvature of the image shell created at the user's eye, a peripheral curvature of the image shell created at the user's eye, a centration of curvature of the image shell created at the user's eye, peripheral myopic defocus cues in the user's periphery, peripheral contrast, and the like) to different sets of user characteristics. Implementations of the generated eye model can output personalized control parameter values for one or more of these optical parameters experienced at the user's eye.

In some implementations, a personalized eye model can simulate optical parameters at the eye according to dynamic state parameters tracked for the user. For example, an eye model can receive as input one or more static eye characteristics (e.g., spherical refraction, age, etc.) and one or more tracked dynamic eye parameters (e.g., accommodation state). The definitions of one or more eye model elements (e.g., anterior cornea, posterior cornea, pupil, anterior lens, posterior, retina, any other suitable eye model element, or any combination thereof) can be based on static eye characteristics, dynamic eye parameters (e.g., accommodation state), or any combination thereof. For example, when an eye model element definition is based on a dynamic eye parameter, the values used to simulate optical parameters according to this eye model element are adjusted when user eye tracking indicates a change in the dynamic eye parameter.

In some implementations, a personalized eye model can map user characteristics and dynamic state parameters to optical parameter controls. For example, model data can include sets of data that match favorable value ranges for one or more optical parameters experienced at the user's eye to different sets of user characteristics and different sets of dynamic state parameters (e.g., pupil size, pupil position in eye box, gaze vector/fixation distance, accommodative state, vergence state/distance, time of day, recent time of fixation at distance, background visual distance/intensity, etc.). Implementations of the generated eye model can output personalized control parameter values for one or more of these optical parameters experienced at the user's eye according to the monitored dynamic state parameters for a user (e.g., dynamic state parameters monitored while a user in immersed in an XR environment).

At block 1006, process 1000 can initiate an XR environment for the user. For example, the user can interact with the XR system in a variety of modes. An XR environment can be initiated for the user when the user dons an XR device to take an action through such a device (e.g., enters an area/moves to a location related to an XR environment). In some implementations, an HMD of an XR system can display an immersive XR environment to the user.

At block 1008, process 1000 can track dynamic parameters for the user. For example, the XR system can include one or more sensors to track the dynamic state parameters for the user while the user is immersed in the XR environment. Example dynamic state parameters that can be tracked include pupil size, pupil position in eye box, gaze vector/fixation distance, accommodative state, vergence state/distance, time of day, recent time of fixation at distance, background visual distance/intensity (e.g., for AR/MR), and other suitable dynamic state parameters. In various cases depending on the configuration of the eye model, such tracked dynamic parameters can be used to update the generated eye model for the user and/or as inputs to the generated eye model.

At block 1010, process 1000 can adjust optics to control optical parameters at the user's eyes according to the tracked dynamic state parameters and output from the eye model. For example, the eye model can output control parameters for one of more of the optical parameters, and the optics presented to the user can be adjusted to achieve the control parameters output by the eye model.

Figure 11:
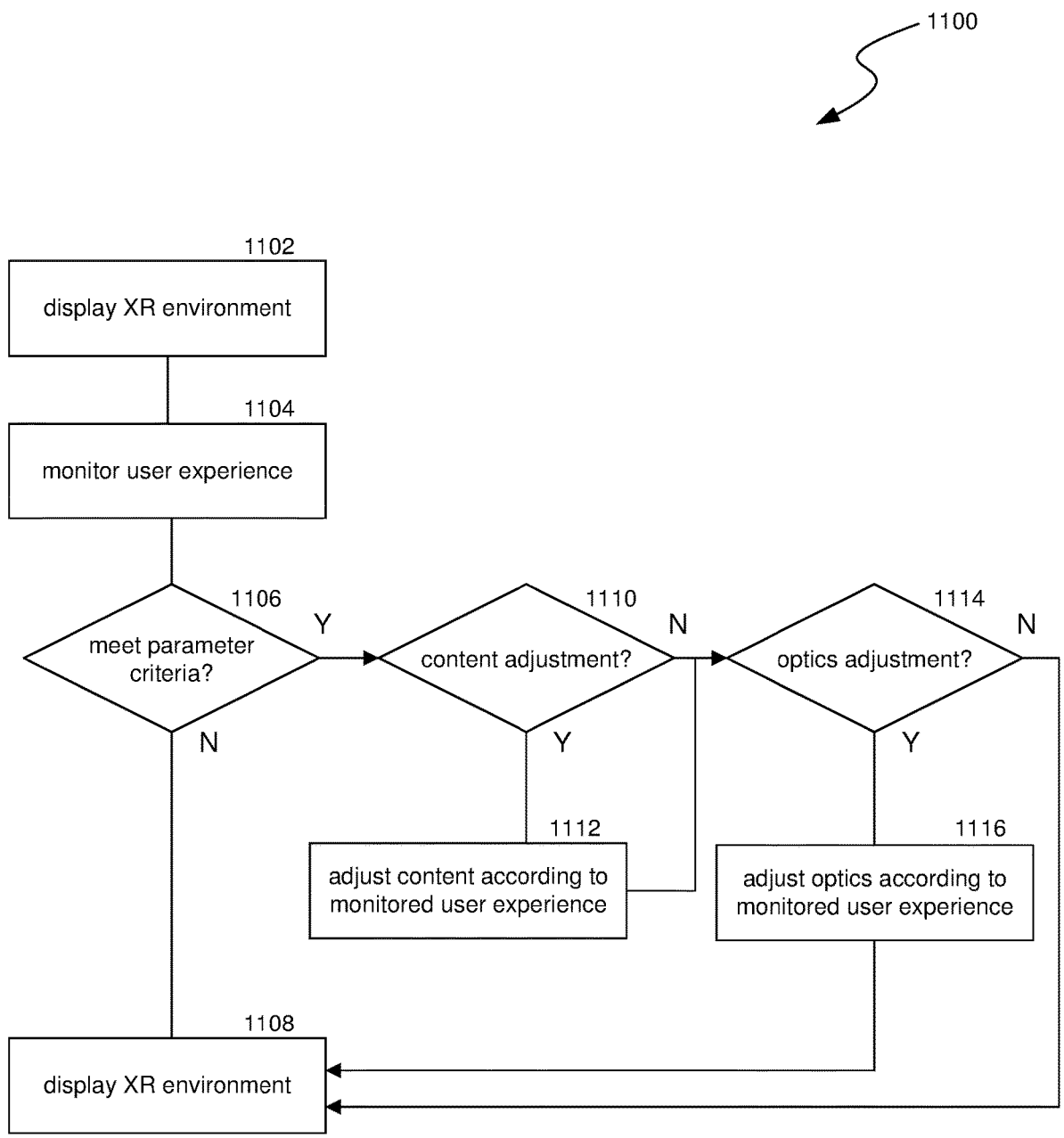
FIG. 11 is a flow diagram illustrating a process used in some implementations of the present technology for controlling visual parameters by an artificial reality system to vary a user experience.

FIG. 11 is a flow diagram illustrating a process used in some implementations of the present technology for controlling visual parameters by an artificial reality system to vary a user experience. In some implementations, process 1100 can be used to manipulate the light that enters a user's eye(s) and/or adjust content displayed to the user to vary the user's experience. Process 1100 can be triggered when an XR system presents an XR environment to a user. Implementations of process 1100 are performed by an XR system, such as an HMD.

At block 1102, process 1100 can display an XR environment to a user. For example, an HMD of an XR system can display an immersive or mixed reality XR environment to a user. The XR system can display the XR environment to a user in any other suitable manner.

At block 1104, process 1100 can monitor the visual experiences for a user, such as the parameters of the user's visual experiences with the XR system. For example, the monitored visual experience parameters can include background characteristics experienced by the user over time (e.g., patterns, colors, distance, aggregated defocus distance, etc.); foreground characteristics experienced by the user over time (e.g., object shape, dimensions, colors, distance, etc.); luminance, spectrum, and chromatic balance experienced by the user over time; illumination wave shape/duty cycle experienced by the user over time; contrast (e.g., contrast polarity) experienced by the user over time; spatial frequency experienced by the user over time; longitudinal chromatic aberration (LCA) experienced by the user over time; and other suitable visual experience parameters related to displayed content. In some implementations, the visual experience parameters can be monitored by monitoring the light emitted to the user (e.g., the light displayed in portions of the XR environment by the XR system). For example, characteristics of virtual objects and/or virtual environments displayed to the user can be monitored over time to generate the monitored visual experience parameters.

In some implementations, the monitored visual experience parameters can include optical parameters created at the user's eye by the XR system, such as eye image shell characteristics (e.g., image shell curvature, centration, etc.), periphery characteristics (e.g., periphery curvature, contrast, defocus cues, etc.), focal distance, eye movement, accommodation distances, and any other suitable optical parameters. For example, implementation can manipulate light to control optical parameters at the user's eye(s), and the controlled optical parameters can be tracked to generate the monitored visual experience parameters.

In some implementations, the monitored optical parameters experienced by the user/created at the user's eye by the XR system can be simulated optical parameters using a personalized eye model. For example, a personalized eye model for the user can be generated and/or obtained. The personalized eye model can simulate optical parameters created/experienced at the user's eye using the light that the XR system displayed to the user.

At block 1106, process 1100 can determine whether one or more parameter criteria have been met by the monitored visual experience parameters. An example visual experience criteria can include a threshold amount of time for a monitored visual experience parameter (e.g., centration of curvature of an image shell, field of view, focal distance, etc.) to be consistently displayed/provided to a user (e.g., displayed with little or no variation). It can be determined that one or more parameter criteria are met when a given monitored visual experience parameter meets a defined criteria (e.g., threshold amount of time for the given visual experience parameter).

When one or more parameter criteria have been met by the monitored visual experience parameters, process 1100 can progress to block 1110. When one or more parameter criteria have not been met by the monitored visual experience parameters, process 1100 can progress to block 1108. At block 1108, process 1100 can display an XR environment to the user. For example, an HMD of an XR system can display an immersive XR environment to a user. The XR system can display the XR environment to a user in any other suitable manner.

At block 1110, process 1100 can determine whether a content adjustment should be performed. For example, a content adjustment can adjust a displayed background, a displayed foreground, a spectrum for emitted light, a luminance, a distance for an object in focus, a user field of view, and other suitable content. These content adjustments can impact a user's vision, eye biology, and/or eye fatigue. Accordingly, a content adjustment can be performed to improve the impact the XR system has on the user's eye(s).

When it is determined that a content adjustment should be performed, process 1100 progresses to block 1112. When it is determined that a content adjustment should not be performed, process 1100 progresses to block 1114. At block 1112, process 1100 can adjust the content presented/displayed to a user according to the monitored visual experience parameter(s). In some implementations, when a met criteria corresponds to a monitored visual experience parameter for the field of view presented to the user, it can be determined that the content should be adjusted to vary the field of view (e.g., grow or shrink the field of view). In another example, when the met criteria corresponds to a monitored visual experience parameter for a contrast polarity presented to the user, it can be determined that the content should be adjusted to vary the contrast polarity (e.g., generate a larger or smaller chromatic contrast between a foreground and background). In another example, when the met criteria corresponds to a monitored visual experience parameter for a spatial frequency experienced by the user, it can be determined that the content should be adjusted to vary the display of one or more objects, such as by moving the object closer or farther from the user presence in the XR environment, growing or shrinking a size of the object, or altering the display of the object in any other manner to vary the spatial frequency experienced by the user. Implementations of the XR system can alter content by instructing a software application (e.g., that implements the XR environment) to adjust the relevant content. Any other suitable technique to alter content presented/displayed to the user can be implemented.

At block 1114, process 1100 can determine whether an optics adjustment should be performed. For example, an optics adjustment can control characteristics of an image shell generated at a user's eye (e.g., image shell curvature, image shell centration, optical axis, etc.), characteristics of the optical parameters at a user's periphery (e.g., peripheral defocus cues, peripheral contrast, peripheral curvature), and other suitable optical parameters at the user's eye. These optical parameters can impact a user's vision, eye biology, and/or eye fatigue. Accordingly, an optics adjustment can be performed to improve the impact the XR system has on the user's eye(s).

In some implementations, when the met criteria corresponds to a monitored visual experience parameter for image shell centration at the user's eye, it can be determined that the optics should be adjusted to vary the image shell centration. In another example, when the met criteria corresponds to a monitored visual experience parameter for a peripheral curvature at the user's eye, it can be determined that the optics should be adjusted to vary the peripheral curvature. In another example, when the met criteria corresponds to a monitored visual experience parameter for a focus distance at the user's eye, it can be determined that the optics should be adjusted to vary the focus distance.

When it is determined that an optics adjustment should be performed, process 1100 progresses to block 1116. When it is determined that an optics adjustment should not be performed, process 1100 progresses to block 1108, where the XR environment is displayed to a user according to any performed content adjustment (or any other suitable adjustment).

At block 1116, process 1100 can adjust one or more lenses of the XR system to adjust the optics presented/displayed to a user. In some implementations, a lens adjustment can control one or more of focal distance, MTF (at eccentricity), field of view, image shell curvature, image shell centration, peripheral defocus cues, peripheral contrast, or any other suitable optical parameters at the user's eye. For example: a) when the met criteria corresponds to a monitored visual experience parameter for image shell centration at the user's eye, one or more lenses can be controlled to vary the image shell centration; b) when the met criteria corresponds to a monitored visual experience parameter for a peripheral curvature at the user's eye, one or more lenses can be adjusted to vary the peripheral curvature; and/or c) when the met criteria corresponds to a monitored visual experience parameter for a focus distance at the user's eye, one or more lenses can be adjusted to vary the focus distance.

In an example, controlling an XR system to adjust light entering the user's eye can include selectively applying an electric field to a GRIN LC lens to selectively tune portions of the lens, manipulate light that passes through the lens, and control optical parameters at the user's eye. In another example, switchable components of a freeform varifocal optical assembly and/or optical elements of a varifocal optical system with controllable focal power can be selectively controlled to manipulate light that passes through the lens(es) and control optical parameters at the user's eye. After block 1116, process 1100 can progress to block 1108 and display the XR environment to the user using any suitable adjustments performed at blocks 1112 and 1116

In some implementations, output control parameters can control one or more devices at the XR system (e.g., lenses)

to adjust the light entering the user's eye. In another example, the output control parameters can control light emitted by the XR system to adjust the light entering the user's eye. In some implementations, the output control parameters can control adjustments for the light entering the user's eye, such as to control/adjust a focal distance of one or more objects, one or more defocus cues created at the user's eye, a chromatic balance of the light entering the user's eye, luminance, a field of view displayed to the user, an image shell created at the user's eye, a curvature of the image shell created at the user's eye, a peripheral curvature of the image shell created at the user's eye, a centration of curvature of the image shell created at the user's eye, peripheral myopic defocus cues in the user's periphery, peripheral contrast, or any combination thereof.

In an example, controlling an XR system to adjust light entering the user's eye can include selectively applying an electric field to a GRIN LC lens to selectively tune portions of the lens, manipulate light that passes through the lens, and control optical parameters at the user's eye. In another example, switchable components of a freeform varifocal optical assembly and/or optical elements of a varifocal optical system with controllable focal power can be selectively controlled to manipulate light that passes through the lens(es), and control optical parameters at the user's eye.

In some implementations, an eye model for a user can be received (e.g., rather than generated), and the received eye model can be used to provide a personalized XR experience for the user. For example, tracked dynamic state parameters can be input to the received model, control parameters can be output by the received model, and optics presented to the user by the XR system can be adjusted according to the output control parameters.

In some implementations, the optical axis is adjusted according to the control parameters output by the eye model. For example, the optical axis can be controlled to maintain a consistent image shell curvature on a user's retina in the presence of user eye/gaze movement. In some implementations, a "swimming effect" caused by optical components of the XR system can be mitigated by the adjustments. For example, a swimming effect can cause objects to appear distorted when a user's head/eye(s) move as light is entering the user's eye(s) via a different portion of the optical system/lens. The swimming effect can be mitigated by implementations, for example by controlling the focal distance (at center of fixation), the image shell curvature, and/or the image shell centration.

Figure 12:
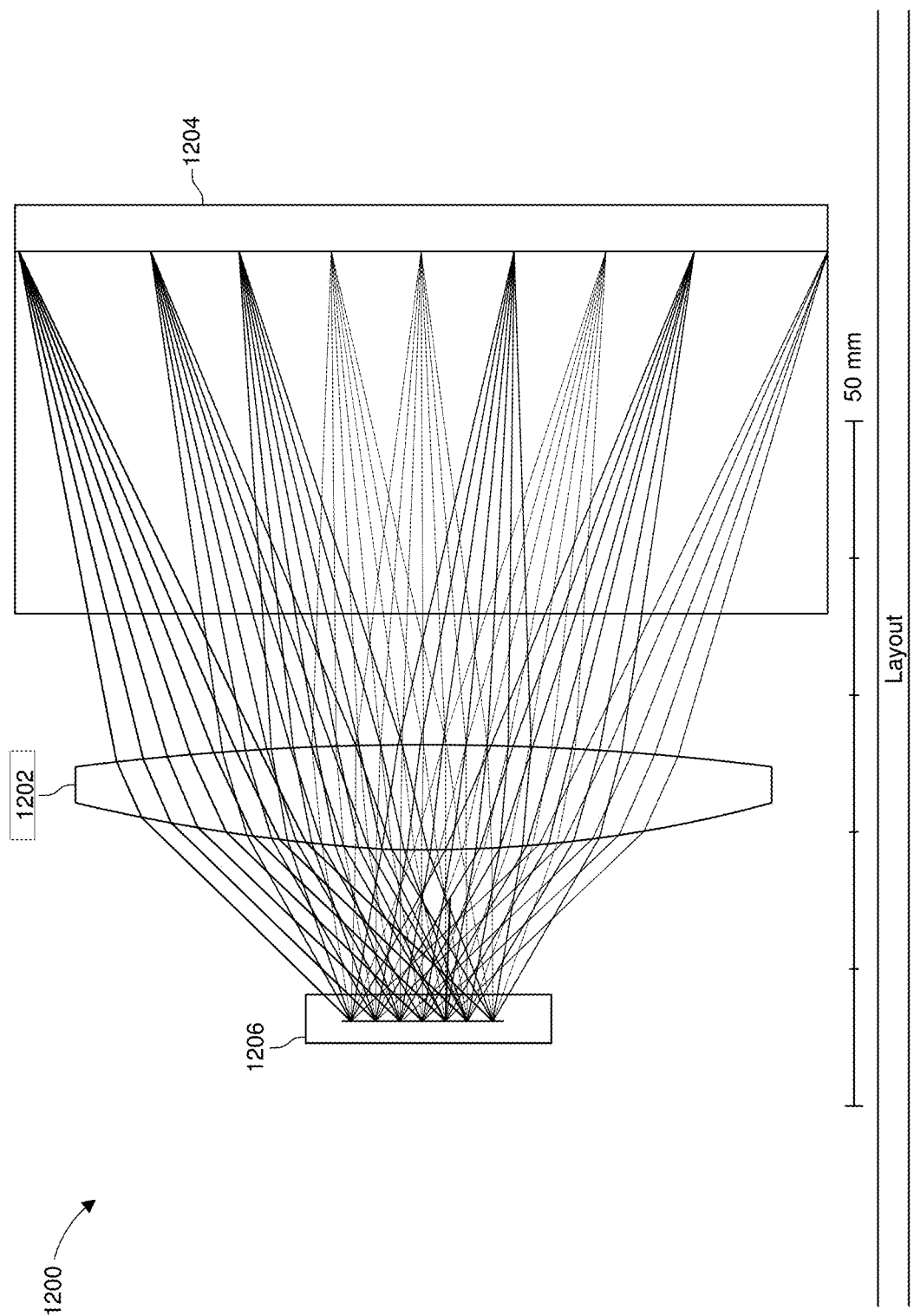
FIG. 12 is a diagram illustrating a model of the optical parameters of light output from a display device.

Implementations of eye model(s) simulate optical parameters experienced at a user's eye from light that enters the user's eye. Such eye model(s) include techniques to simulate how light controlled by XR device(s) is experienced at the user's eye. FIG. 12 is a diagram illustrating a model of the optical parameters of light output from a display device. Model 1200 includes XR system 1202, light source 1204, and output light 1206. In some implementations, light source 1104 can be part of XR system 1202. In another example, light source 1204 can be a simulated real-world light source that emits light that passes through XR system 1202 (e.g., one or more lenses of the system). Model 1200 models the characteristics of output light 1206 that is output from XR system 1202.

Figure 13:
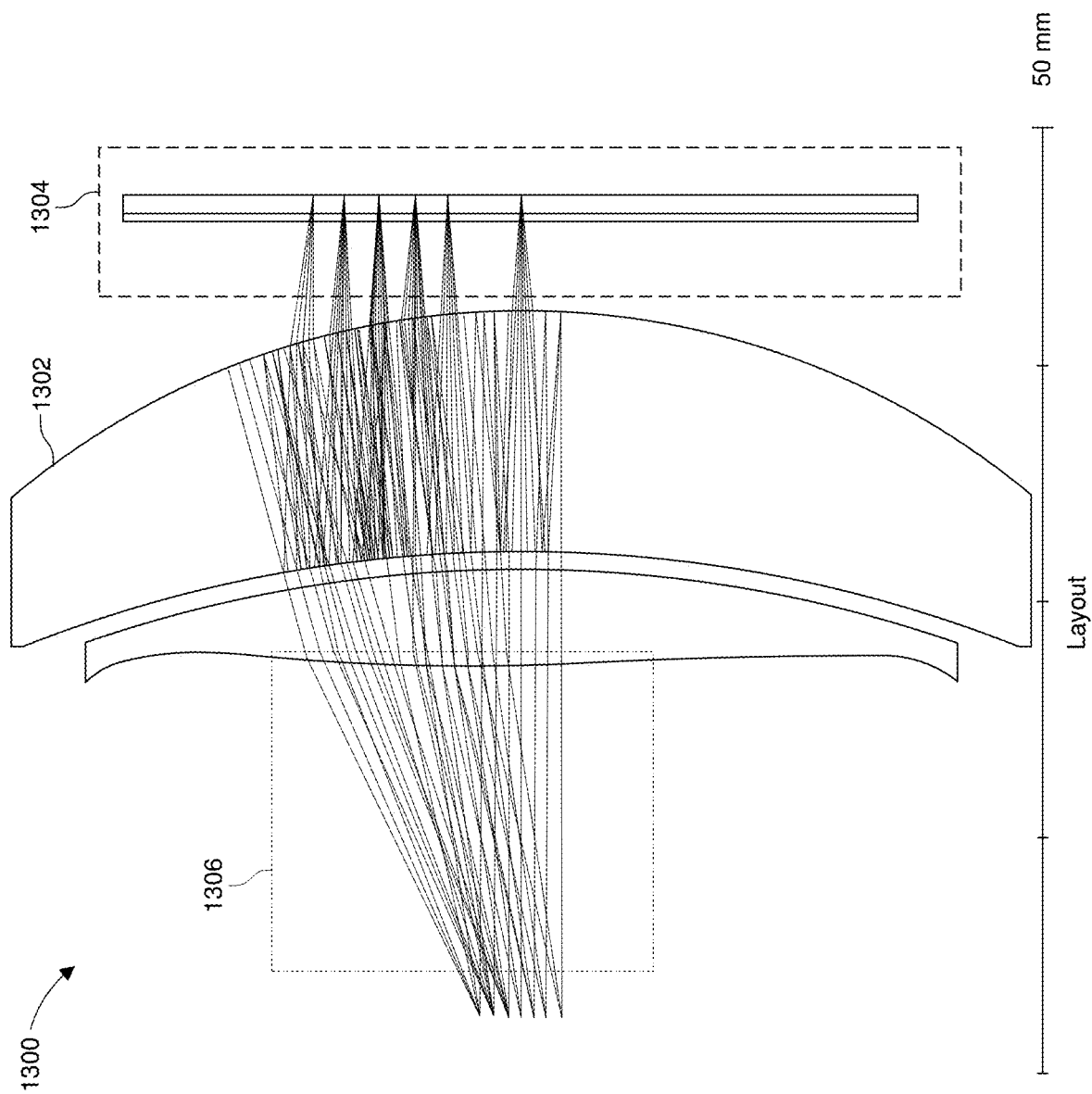
FIG. 13 is a diagram illustrating another model of the optical parameters of light output from another display device.

FIG. 13 is a diagram illustrating another model of the optical parameters of light output from another display device. Model 1300 includes XR system 1302, light source 1304, and output light 1306. In some implementations, light source 1304 can be part of XR system 1302. In another example, light source 1304 can be a simulated real-world light source that emits light that passes through XR system 1302 (e.g., one or more lenses of the system). Model 1300 models the characteristics of output light 1306 that is output from XR system 1302.

Figure 14:
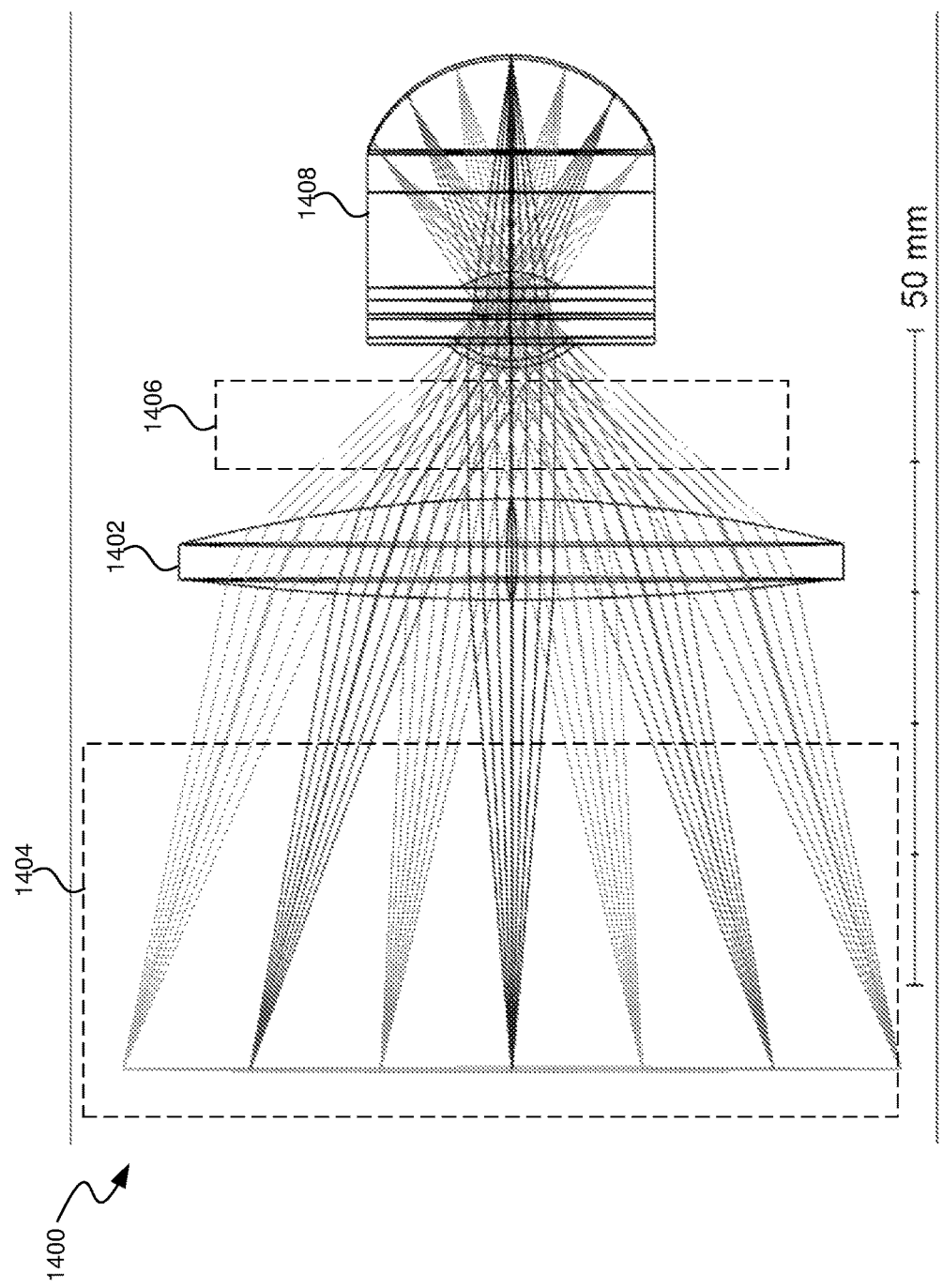
FIG. 14 is a diagram illustrating a model of the optical parameters of light output from a display device in combination with an eye model.

In some implementations, the light output from XR systems can be modeled in combination with eye model(s) disclosed herein. FIG. 14 is a diagram illustrating a model of the optical parameters of light output from a display device in combination with an eye model. Model 1400 includes XR system lens 1402, light source 1404, output light 1406 and eye model 1408. In some implementations, light source 1404 can be part of the XR system that provides lens 1402, an external light source (e.g., simulated real-world light source), or any combination thereof. Model 1400 models the optical parameters experienced at eye model 1408 from output light 1406.

Figure 15:
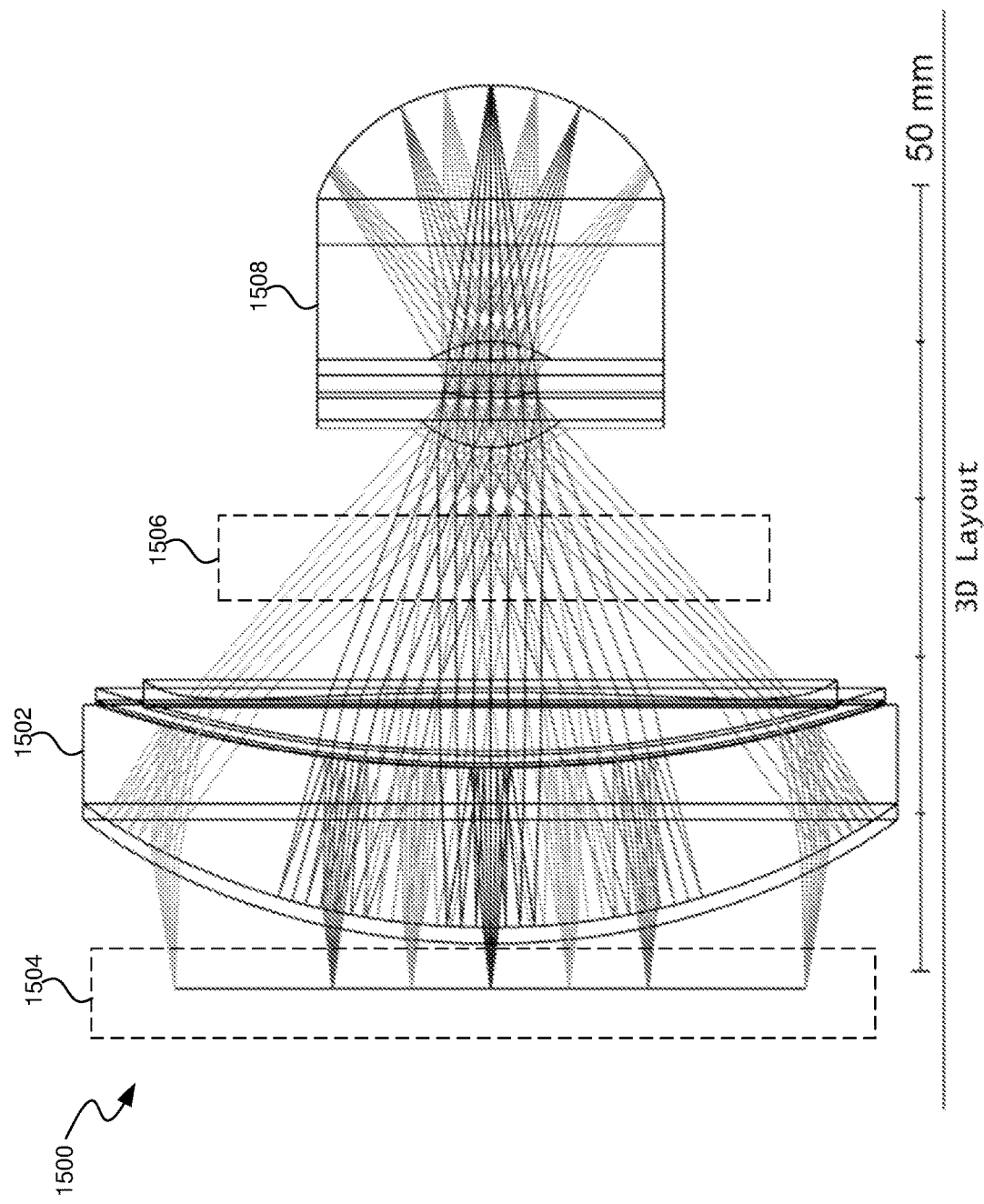
FIG. 15 is a diagram illustrating another model of the optical parameters of light output from another display device in combination with an eye model.

FIG. 15 is a diagram illustrating a model of the optical parameters of light output from another display device in combination with an eye model. Model 1500 includes XR system 1502, light source 1504, output light 1506 and eye model 1508. In some implementations, light source 1504 can be part of XR system 1502, an external light source (e.g., simulated real-world light source), or any combination thereof. Model 1500 models the optical parameters experienced at eye model 1508 from output light 1506 that is output from XR system 1502.

In some implementations, models 1200, 1300, 1400, and 1500 can be 3D models configured for use with modeling software (e.g., Zemax models). Eye models 1408 and 1508 can include stacked/combined model elements that comprise the human eye, such as pupil elements, cornea elements, retina elements, and the like. Each model element can include defined characteristics that control the way light is simulated at the eye model(s), such as how light is altered when passing through the model element.

Example model elements of the eye model(s) include an anterior cornea (e.g., defined by a radius, thickness, asphericity, refractive index, etc.), posterior cornea (e.g., defined by a radius, thickness, asphericity, refractive index, etc.), pupil (e.g., defined by a semidiameter), anterior lens (e.g., defined by a radius, thickness, asphericity, refractive index, etc.), posterior lens (e.g., defined by a radius, thickness, asphericity, refractive index, etc.), retina (e.g., defined by a radio, asphericity, etc.), and any other suitable eye model element. In some implementations, the eye model elements can be defined relative to characteristics of the user's eye, such as spherical refraction or degree of myopia (e.g., in diopters) or 'SR', degree of accommodation (e.g., in diopters) or 'Acc', age (e.g., in years), and any other suitable characteristics.

The following represents definitions (e.g., values, mathematical expressions) for eye model elements based on user eye characteristics (e.g., SR, Acc, age) in some implementations:

Anterior Cornea

Radius (mm)

$R = 7.77 + 0.022 * SR$

Asphericity $Q = -0.24 + 0.003 * Age$

Thickness $d = 0.55$

Refractive Index $n = 1.361594 + 6.009687 * 10^{-3} * \lambda^{-2} - 6.760760 * 10^{-4} * \lambda^{-4} + 5.908450 * 10^{-5} * \lambda^{-6}$ Simplified implementation: n=1.376
Posterior Cornea
  Radius (mm)

$R=6.4$

Asphericity $Q=-0.1-0.007*Age$

Thickness $d=3.15-0.05*\ln(Acc+1)$

Refractive Index (Aqueous Humour)

$n=1.323016+6.077158*10^{-3}*\lambda^{-2}-7.069706*10^{-4}*\lambda^{-4}+6.154303*10^{-5}*\lambda^{-6}$ Simplified implementation: n=1.3374
Pupil
  Semidiameter (mm)

$Sd=3$

Anterior Lens
  Radius (mm)

$R=12.9-0.057*Age-1.75*\ln(Acc+1)$

Asphericity $Q=-5-0.34*\ln(Acc+1)$

Thickness $d=3.0+0.2*\ln(Acc+1)+0.024*Age$

Refractive Index (Two Parts)

$n_1=(1.3807-0.00039*Age+18*10^{-5}*(10*Acc+Acc^2))+0.0652778*Z-0.0226659*Z^2-0.0020399(X^2+Y^2)$ $n_2=(1.4277-0.00039*Age+18*10^{-5}*(10*Acc+Acc^2))+0.0100737*Z^2-0.0020399(X^2+Y^2)$

Posterior Lens
  Radius (mm)

$R=-6.2+0.012*Age+0.2294*\ln(Acc+1)$

Asphericity $Q=-2-0.125*\ln(Acc+1)$

Thickness $d=16.28-0.299*SR$

Refractive Index (Vitreous Humour)

$n=1.322357+5.560240*10^{-3}*\lambda^{-2}-5.817391*10^{-4}*\lambda^{-4}+5.036810*10^{-5}*\lambda^{-6}$ Simplified implementation: n=1.336
Retina
  Radius (mm)

$R_x=12.91-0.094*SR$ $R_y=-12.72+0.004*SR$

Asphericity $Q_x=0.27+0.026*SR$ $Q_y=0.25+0.017*SR$

For example, one of more of the eye model elements can be defined as components with a software modeling framework, such as within a Zemax material catalog (e.g., as a .AGF file). Eye models defined in implementations can comprise stacks/combinations of these defined eye model elements.

Figure 16:
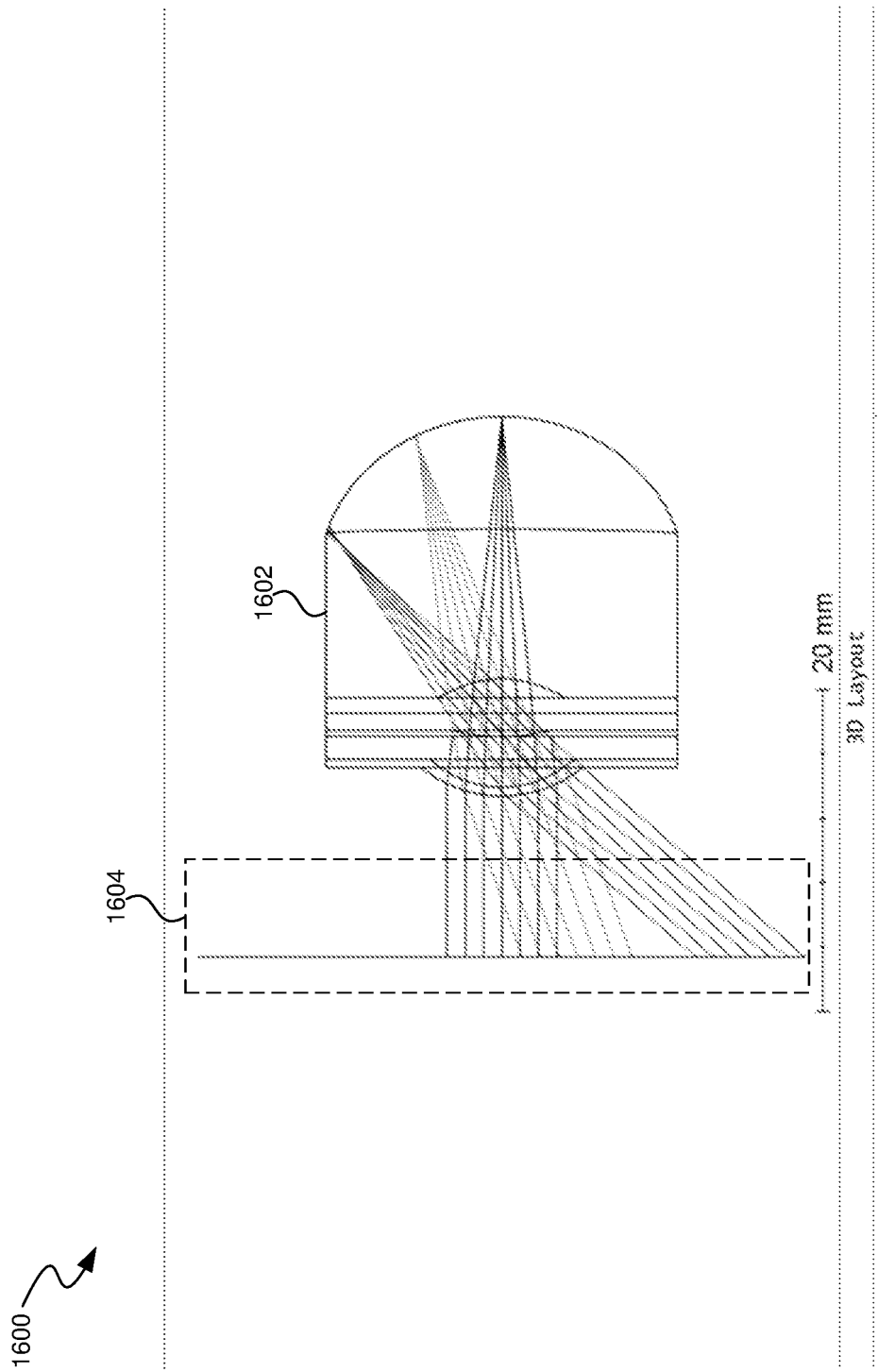
FIG. 16 is a diagram of simulated light exposed to an eye model.

Simulated light conditions can be exposed to the eye model(s) that comprise the definitions for the eye model elements, and the eye model(s) can generate simulated optical parameters experienced at a user's eye. FIG. 16 is a diagram of simulated light exposed to an eye model. An example of eye model 1602 comprises a combination/stack of defined anterior cornea, posterior cornea, pupil, anterior lens, posterior lens, retina, any other suitable eye model element, and any combination thereof. For example, the eye model elements of eye model 1602 can be defined using the user eye characteristics SR=0, age=25, acc=0, tilt X/Y=0. Simulated light 1604 can be exposed to eye model 1602 to simulate optical parameters at the user's eye.

Figure 17:
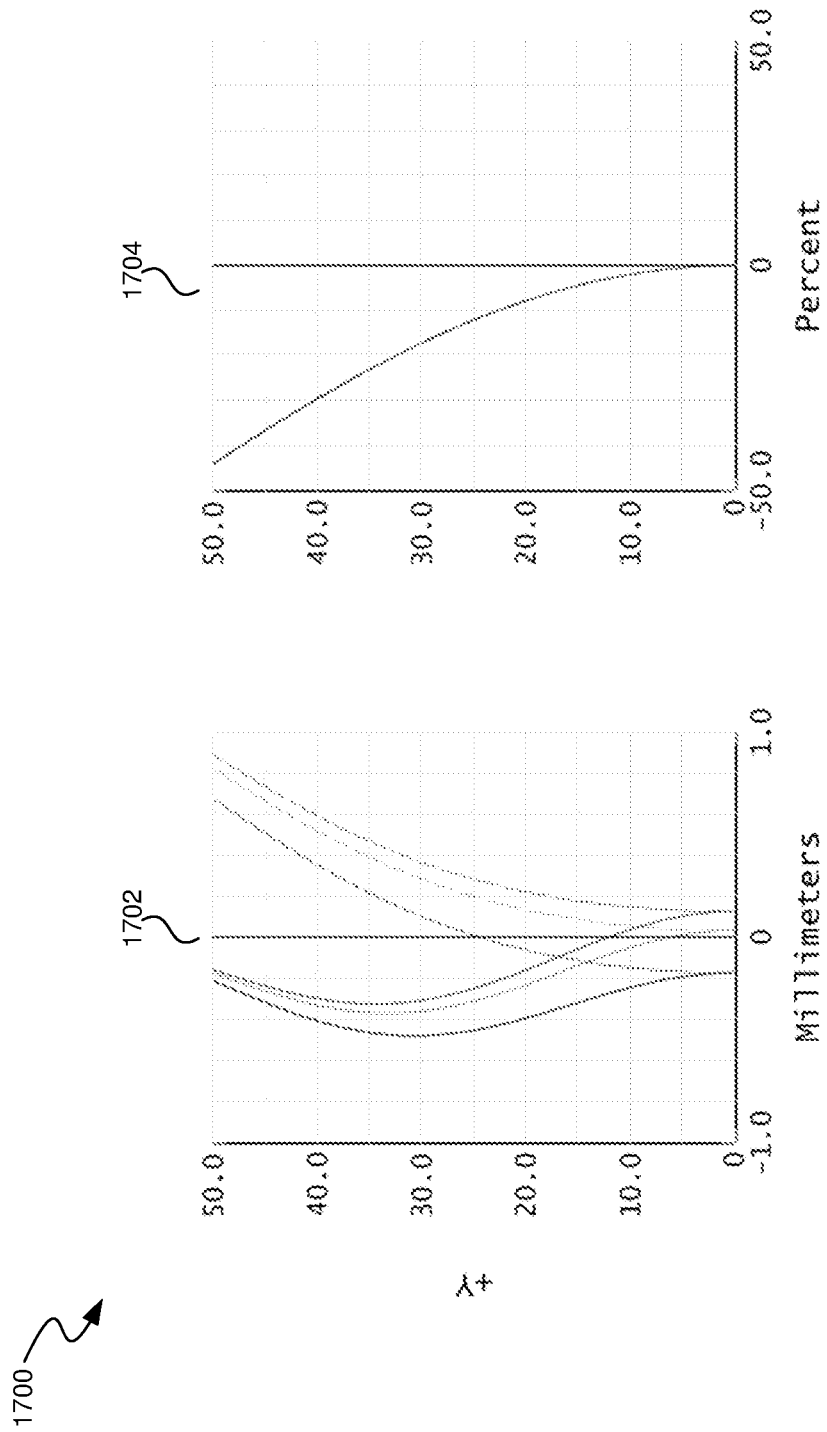
FIG. 17 is a graph of optical characteristics simulated by exposing light to an eye model.

FIG. 17 is a graph of optical characteristics simulated by exposing light to an eye model. Graphs 1702 and 1704 illustrate the simulated field curvature experienced by eye model 1602 when exposed to simulated light 1604. The longitudinal chromatic aberration is about 0.35 mm or 0.94 D. These values validate that the simulation achieved by eye model 1602 matches historic values for longitudinal chromatic aberration.

Figure 18:
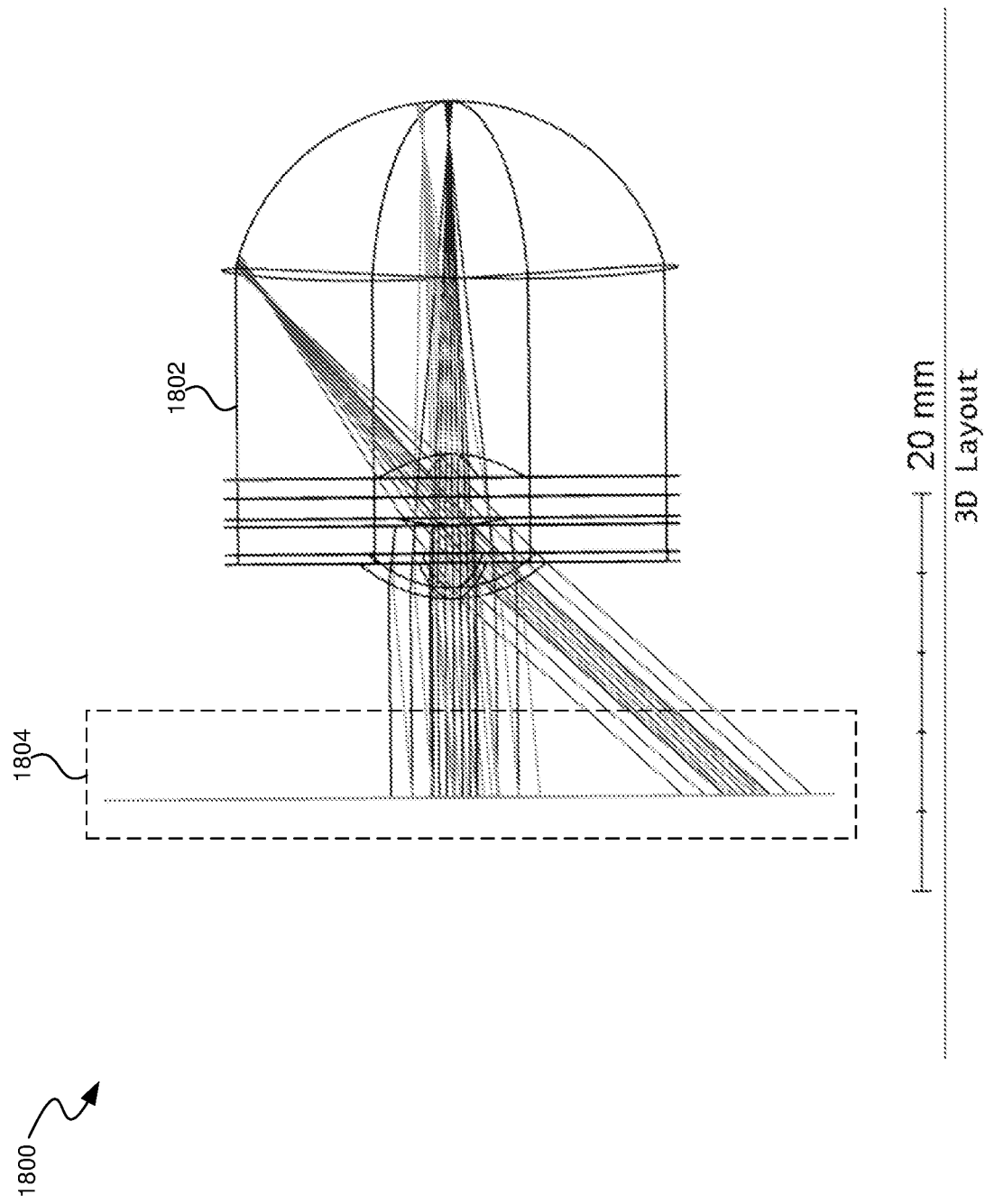
FIG. 18 is another graph of optical characteristics simulated by exposing light to an eye model.

FIG. 18 is another graph of optical characteristics simulated by exposing light to an eye model. An example of eye model 1802 comprises a combination/stack of defined anterior cornea, posterior cornea, pupil, anterior lens, posterior lens, retina, any other suitable eye model element, and any combination thereof. For example, the eye model elements of eye model 1802 can be defined using the user eye characteristics SR=−5 D, age=25, acc=0, tilt X/Y=0. Simulated light 1804 can be exposed to eye model 1802 to simulate optical parameters at the user's eye.

Figure 19:
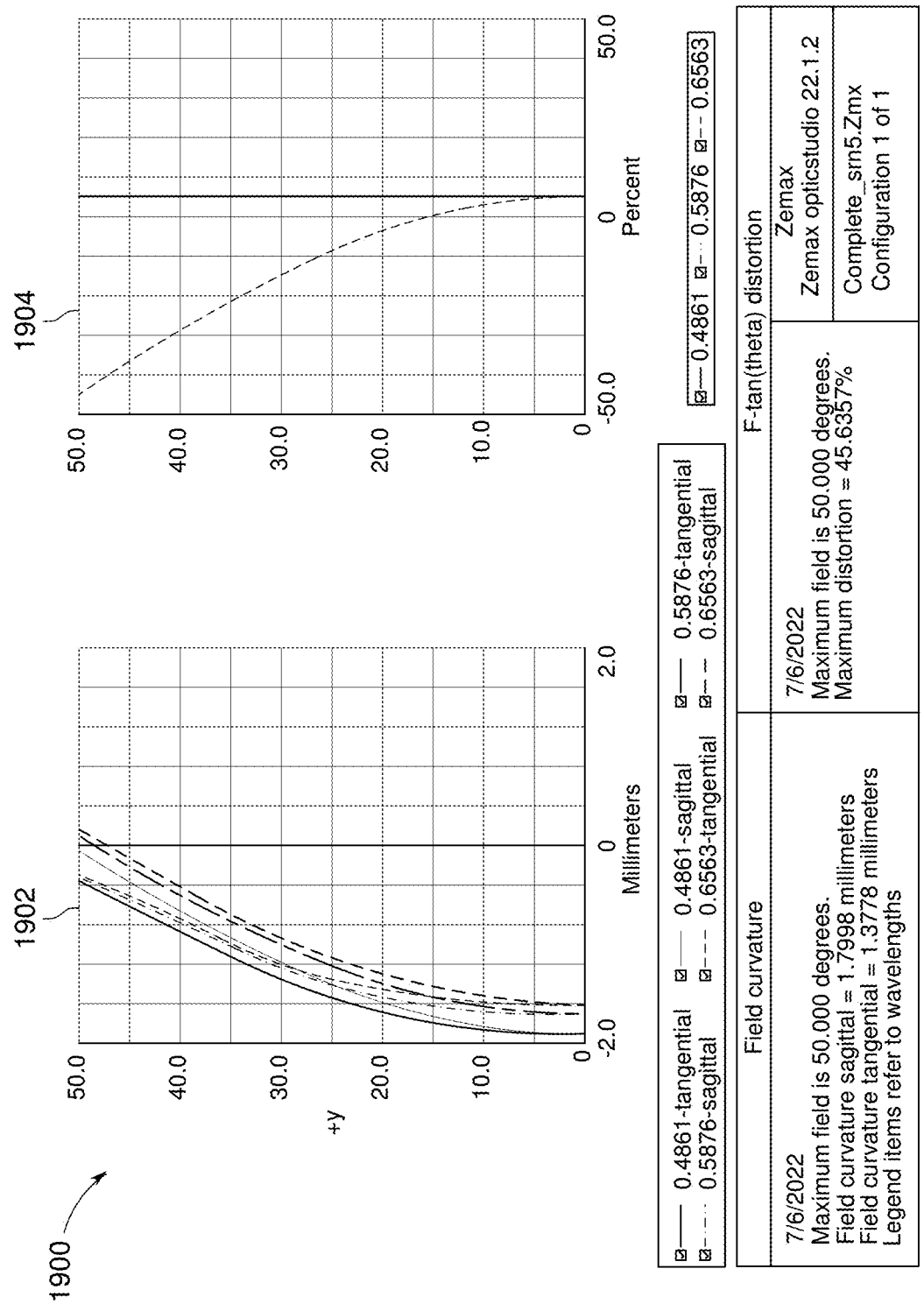
FIGS. 19 and 20 are graphs of optical characteristics simulated by exposing light to another eye model.
Figure 20:
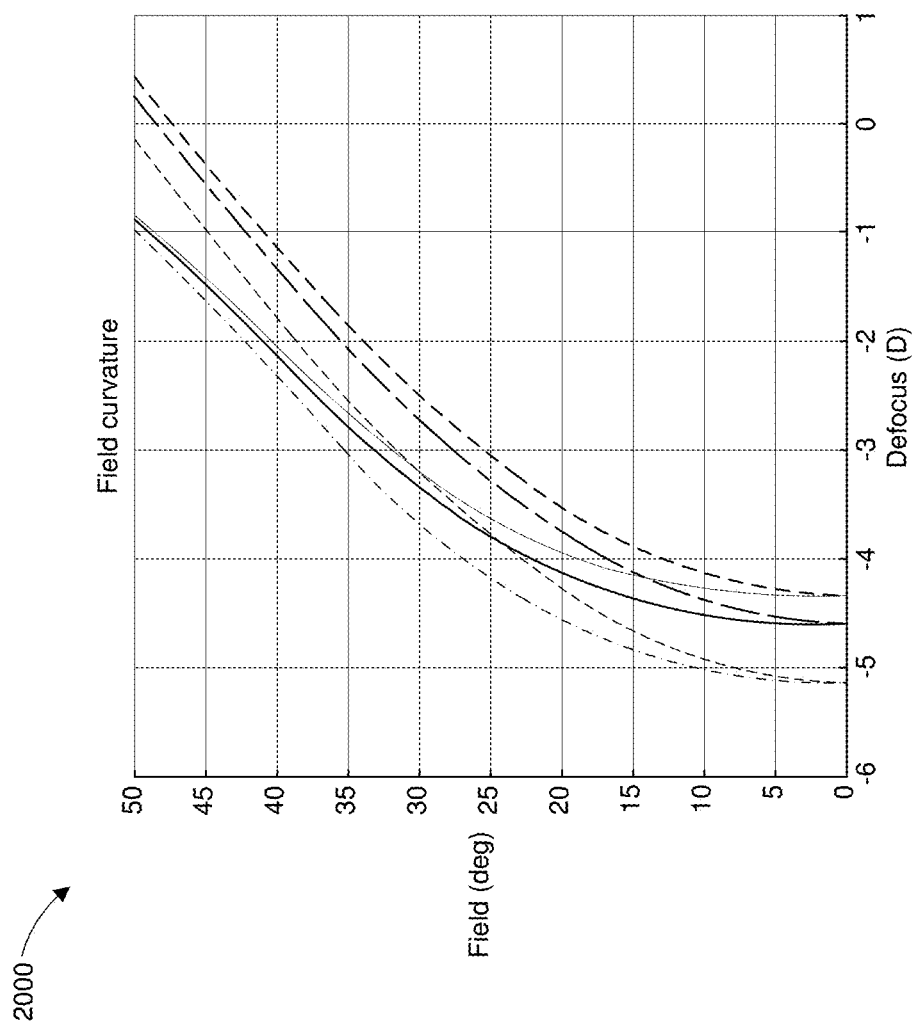

FIGS. 19 and 20 are graphs of optical characteristics simulated by exposing light to another eye model. Graph 1900 of FIG. 19 illustrates the simulated field curvature in terms of defocus (D) experienced by eye model 1802 when exposed to simulated light 1804. The −5 D defocus matches historic values for the user characteristics used to generate eye model 1802. Graph 2000 of FIG. 20 illustrates the simulated defocus (D) in terms of spherical refraction experienced by eye model 1802 when exposed to simulated light 1804. The linear relationship between defocus and SR matches historic values, and a longitudinal chromatic aberration of about 1 D is maintained.

Figure 21:
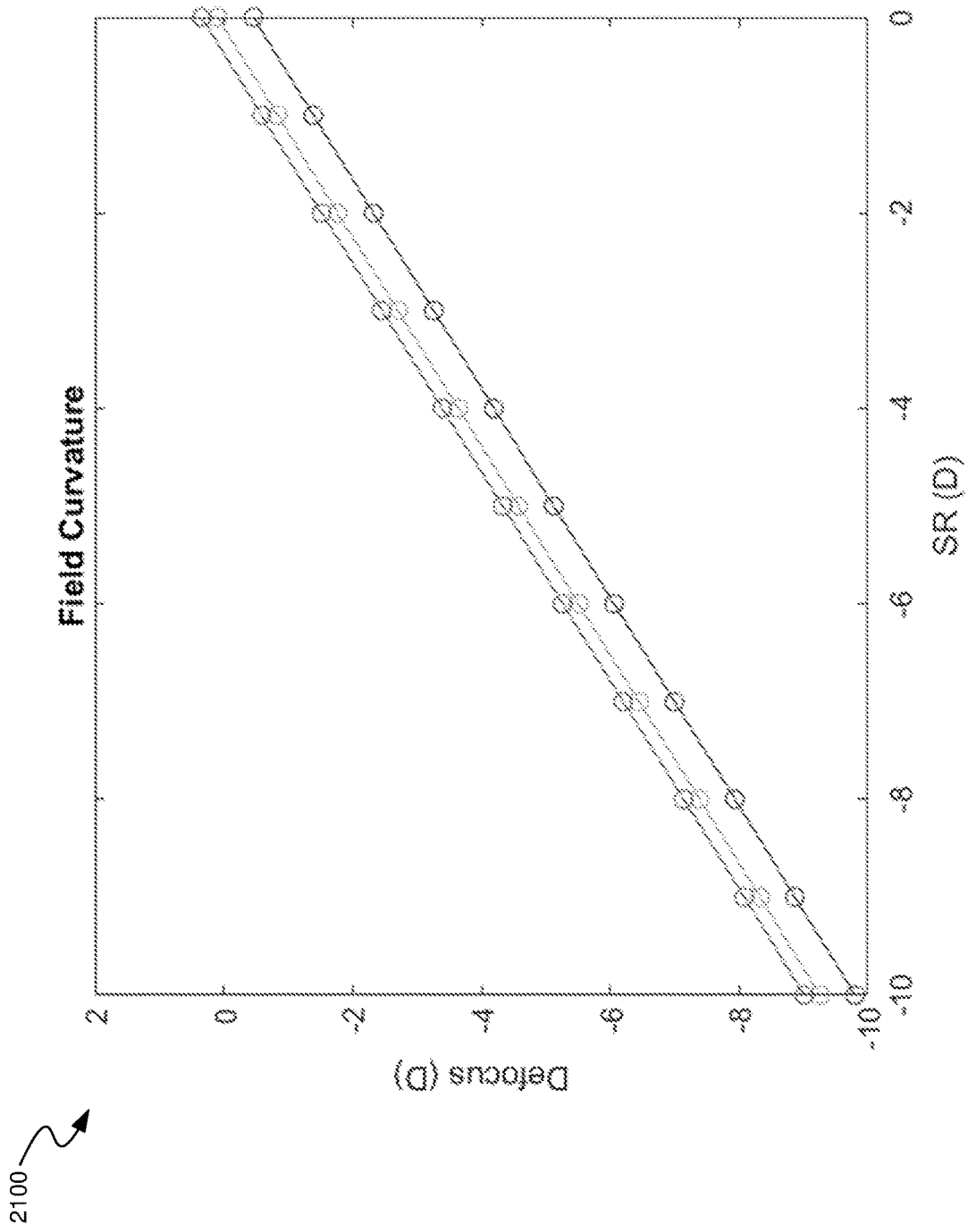
FIGS. 21 and 22 are graphs of optical characteristics simulated by exposing light to eye model variations.
Figure 22:
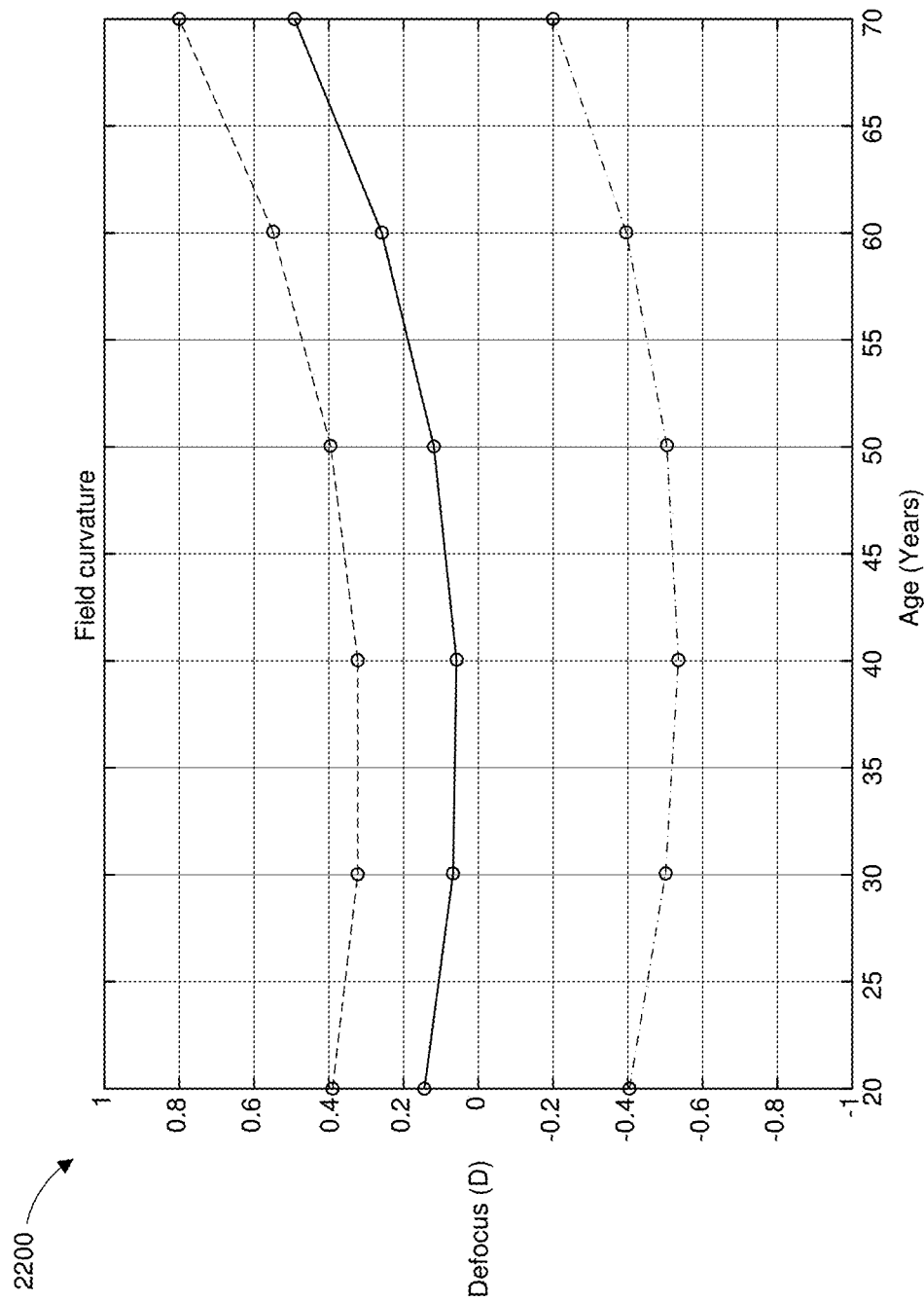

FIGS. 21 and 22 are graphs of optical characteristics simulated by exposing light to eye model variations. Graph 2100 of FIG. 21 illustrates simulated defocus (D) in terms of different spherical refraction values (e.g., simulated using eye models defined by a range of spherical refraction values). The linear relationship between defocus and SR matches historic values, and a longitudinal chromatic aberration of about 1 D is maintained. Graph 2200 of FIG. 22 illustrates the simulated defocus (D) in terms of different age values (e.g., simulated using eye models defined by a range of age values). The expected performance is a maintained focus on-axis across the age range values. The example eye model(s) simulate a less than 0.25 diopter variation for each wavelength across the age values.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for manipulating light using an artificial reality (XR) system to control an image shell at a user's eye, the method comprising:
   displaying, by the XR system, an XR environment to a user;
   tracking, by the XR system, one or more of the user's eyes, the user eye tracking comprising at least pupil tracking; and
   manipulating light entering the user's eye by varying one or more physical characteristics of one or more lenses of the XR system according to the user's tracked eye position, the one or more lenses comprising an optical component of the XR system,
   wherein the manipulating controls one or more optical parameters of an image shell created at the user's eye by the entering light,
   wherein the controlled one or more optical parameters comprise at least a peripheral curvature of the image shell or a center of curvature of the image shell,
   wherein the peripheral curvature of the image shell relates to its curvature relative to a peripheral retina of the user's eye, and
   wherein the center of curvature of the image shell corresponds to a point that is a distance from the image shell curvature equal to a radius of the image shell curvature.

2. The method of claim 1, wherein the varying the one or more physical characteristics of the one or more lenses manipulates the light entering the user's eye and controls one or more of defocus cues created at the user's eye, a wave shape for the light entering the user's eye, a chromatic balance of the light entering the user's eye, a field of view displayed to the user, or any combination thereof.

3. The method of claim 1, wherein the controlled one or more optical parameters further comprise the peripheral curvature of the image shell created at the user's eye, the centration of curvature of the image shell created at the user's eye, peripheral myopic defocus cues in the user's periphery, or any combination thereof.

4. The method of claim 1, wherein the one or more physical characteristics of the one or more lenses are varied by applying an electric field to selectively to selectively tune portions of the one or more lenses.

5. The method of claim 1, wherein the one or more lenses are part of a varifocal optical system, and varying the one or more physical characteristics of the one or more lenses varies the focal power of the varifocal optical system.

6. The method of claim 1, further comprising:
   obtaining an eye model for the user, wherein the eye model is generated using at least physical properties of one or more of the user's eyes; and
   generating, using the eye model, a set of control parameters for the user, wherein the one or more optical parameters of the image shell created at the user's eye are controlled using the control parameters.

7. The method of claim 6, wherein the physical properties for one or more of the user's eyes comprise at least age and/or spherical refraction.

8. The method of claim 6, wherein the user eye tracking comprises tracking one or more of pupil size, gaze vector, fixation distance, accommodative state, or any combination thereof, and the eye model generates the set of control parameters for the user according to the user eye tracking.

9. A computer-readable storage medium storing instructions that, when executed by a computing system, cause the computing system to perform a process for manipulating light using an artificial reality (XR) system to control an image shell at a user's eye, the process comprising:
   displaying, by the XR system, an XR environment to a user;
   tracking, by the XR system, one or more of the user's eyes, the user eye tracking comprising at least pupil tracking; and
   manipulating light entering the user's eye by varying one or more physical characteristics of one or more lenses of the XR system according to the user's tracked eye position, the one or more lenses comprising an optical component of the XR system, wherein the manipulating controls one or more optical parameters of an image shell created at the user's eye by the entering light, the controlled one or more optical parameters comprising at least a peripheral curvature of the image shell created at the user's eye or a centration of curvature of the image shell created at the user's eye
  wherein the manipulating controls one or more optical parameters of an image shell created at the user's eye by the entering light,
  wherein the controlled one or more optical parameters comprise at least a peripheral curvature of the image shell or a center of curvature of the image shell,
  wherein the peripheral curvature of the image shell relates to its curvature relative to a peripheral retina of the user's eye, and
  wherein the center of curvature of the image shell corresponds to a point that is a distance from the image shell curvature equal to a radius of the image shell curvature.

10. The computer-readable storage medium of claim 9, wherein the varying the one or more physical characteristics of the one or more lenses manipulates the light entering the user's eye and controls one or more of a wave shape for the light entering the user's eye, a chromatic balance of the light entering the user's eye, a field of view displayed to the user, or any combination thereof.

11. The computer-readable storage medium of claim 9, wherein the controlled one or more optical parameters further comprise peripheral myopic defocus cues in the user's periphery.

12. The computer-readable storage medium of claim 9, wherein the one or more physical characteristics of the one or more lenses are varied by applying an electric field to selectively to selectively tune portions of the one or more lenses.

13. The computer-readable storage medium of claim 9, wherein the one or more lenses are part of a varifocal optical system, and varying the one or more physical characteristics of the one or more lenses varies the focal power of the varifocal optical system.

14. The computer-readable storage medium of claim 9, wherein the process further comprises:
  obtaining an eye model for the user, wherein the eye model is generated using at least physical properties of one or more of the user's eyes; and
  generating, using the eye model, a set of control parameters for the user, wherein the one or more optical parameters of the image shell created at the user's eye are controlled using the control parameters.

15. The computer-readable storage medium of claim 14, wherein the physical properties for one or more of the user's eyes comprise at least age and/or spherical refraction.

16. The computer-readable storage medium of claim 14, wherein the user eye tracking comprises tracking one or more of pupil size, gaze vector, fixation distance, accommodative state, or any combination thereof, and the eye model generates the set of control parameters for the user according to the user eye tracking.

17. An artificial reality (XR) system for manipulating light using an artificial reality (XR) system to control an image shell at a user's eye, the XR system comprising:
  one or more processors; and
  one or more memories storing instructions that, when executed by the one or more processors, cause the XR system to perform a process comprising:
    displaying, by the XR system, an XR environment to a user;
    tracking, by the XR system, one or more of the user's eyes, the user eye tracking comprising at least pupil tracking; and
    manipulating light entering the user's eye by varying one or more physical characteristics of one or more lenses of the XR system according to the user's tracked eye position, the one or more lenses comprising an optical component of the XR system,
      wherein the manipulating controls one or more optical parameters of an image shell created at the user's eye by the entering light,
      wherein the controlled one or more optical parameters comprise at least a peripheral curvature of the image shell or a center of curvature of the image shell,
      wherein the peripheral curvature of the image shell relates to its curvature relative to a peripheral retina of the user's eye, and
      wherein the center of curvature of the image shell corresponds to a point that is a distance from the image shell curvature equal to a radius of the image shell curvature.

18. The system of claim 17, wherien the process further comprises:
  obtaining an eye model for the user, wherein the eye model is generated using at least physical properties of one or more of the user's eyes; and
  generating, using the eye model, a set of control parameters for the user, wherein the one or more optical parameters of the image shell created at the user's eye are controlled using the control parameters.

19. The system of claim 18, wherein the physical properties for one or more of the user's eyes comprise at least age and/or spherical refraction.

20. The system of claim 18, wherein the user eye tracking comprises tracking one or more of pupil size, gaze vector, fixation distance, accommodative state, or any combination thereof, and the eye model generates the set of control parameters for the user according to the user eye tracking.

* * * * *